(12) United States Patent
Varner

(10) Patent No.: US 6,796,000 B2
(45) Date of Patent: Sep. 28, 2004

(54) METHOD AND APPARATUS FOR REMOVING STANDING WATER FROM FLAT AND CONTOURED SURFACES

(75) Inventor: Donald Varner, Monterey, CA (US)

(73) Assignee: One Pass LLC, Hollister, CA (US)

( * ) Notice: Subject to any disclaimer, the term of this patent is extended or adjusted under 35 U.S.C. 154(b) by 0 days.

(21) Appl. No.: 10/461,536

(22) Filed: Jun. 13, 2003

(65) Prior Publication Data

US 2004/0055103 A1 Mar. 25, 2004

Related U.S. Application Data

(63) Continuation-in-part of application No. 10/254,295, filed on Sep. 24, 2002, now abandoned.

(51) Int. Cl.[7] .................................................. A47L 1/06
(52) U.S. Cl. .......................... 15/245; 15/143.1; D32/41
(58) Field of Search .............................. 15/143.1, 245; D32/41

(56) References Cited

U.S. PATENT DOCUMENTS

| | | | | |
|---|---|---|---|---|
| 200,611 A | * | 2/1878 | Hall | 15/245 |
| 824,473 A | * | 6/1906 | Foskett | 15/245 |
| 1,541,088 A | * | 6/1925 | Whatenack | 15/245 |
| 1,555,145 A | * | 9/1925 | Naslin | 15/245 |
| 2,158,695 A | * | 5/1939 | Foss | 15/245 |
| 4,989,511 A | * | 2/1991 | Clarke, Jr. | 15/143.1 X |
| 5,337,523 A | * | 8/1994 | Walsh | 15/245 X |
| 5,454,132 A | * | 10/1995 | Neves | 15/245 X |
| D388,569 S | * | 12/1997 | Israel | D32/41 |
| 5,920,947 A | | 7/1999 | Varner | 15/245 |
| D422,124 S | * | 3/2000 | Rimback | D32/41 |
| 6,126,756 A | | 10/2000 | Varner | 134/6 |
| 6,243,911 B1 | | 6/2001 | Varner | 15/245 |
| 2002/0100135 A1 | * | 8/2002 | Machesky | 15/245 |

FOREIGN PATENT DOCUMENTS

| | | | | |
|---|---|---|---|---|
| GB | 7941 | * | 1/1913 | 15/245 |

* cited by examiner

*Primary Examiner*—Mark Spisich
(74) *Attorney, Agent, or Firm*—Donald R. Boys; Central Coast Patent Agency, Inc.

(57) ABSTRACT

A water-wiping apparatus for wiping standing water from a curved surface has a flexible panel of a first height, with an upper long edge of a first length and a lower long edge of a second length, greater than the first length, the upper long edge centered on the length of the lower long edge, a substantially rigid handle having a length substantially equal to the first length attached along the upper long edge, and a lip formed along the lower edge, extending to one side of the flexible panel and ending in a sharp line at the end away from the flexible panel.

12 Claims, 20 Drawing Sheets

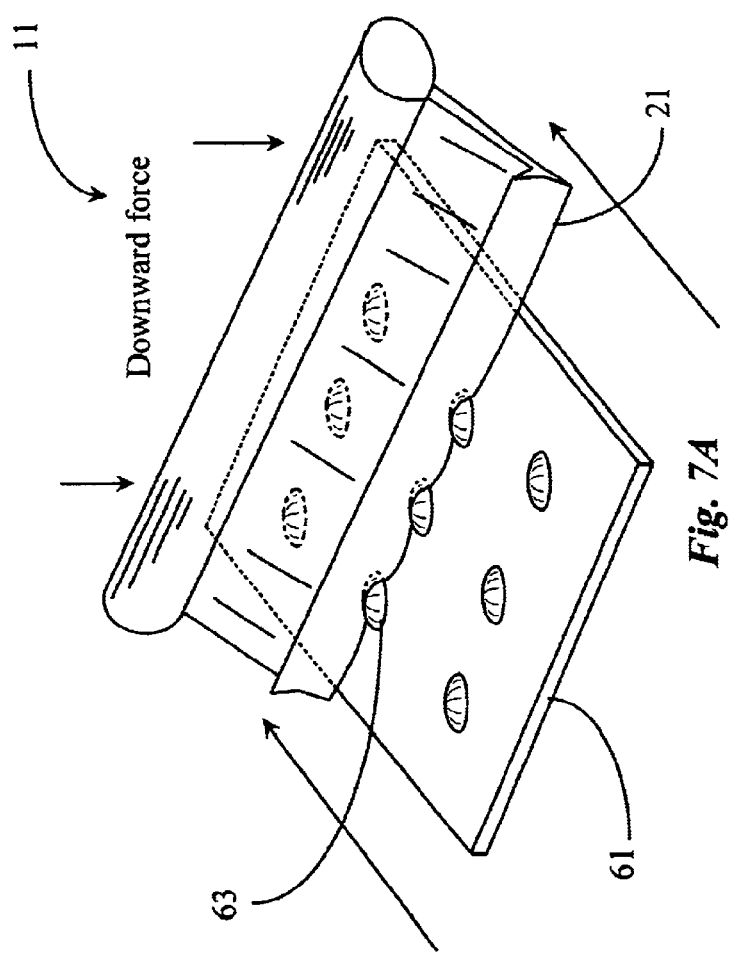
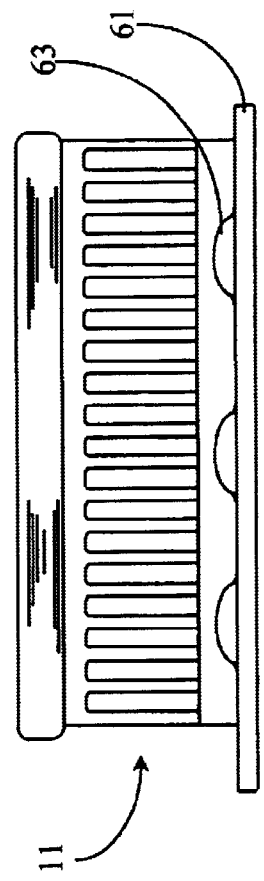
Fig. 7A
Fig. 7B

METHOD AND APPARATUS FOR REMOVING STANDING WATER FROM FLAT AND CONTOURED SURFACES

CROSS-REFERENCE TO RELATED DOCUMENTS

The present patent application is continuation in part of application Ser. No. 10/254,295, filed on Sep. 24, 2002 abandoned. The present application is related to application Ser. No. 09/501,352, filed on Feb. 09, 2000, Ser. No. 09/205,420, filed on Dec. 04, 1998 U.S. Pat. No. 6,243,911, Ser. No. 09/059,661 filed on Apr. 13, 1998 U.S. Pat. No. 6,126,756 and Ser. No. 08/859,836, filed on May 16, 1997 U.S. Pat. No. 5,920,947.

FIELD OF THE INVENTION

The present invention is in the field of car-wash accessories and pertains more particularly to hand-held devices used for removing standing water from, and applying spray-on wax to automobiles and other vehicles.

BACKGROUND OF THE INVENTION

One of the largest and most lucrative product markets in the United States involves cosmetic accessories for automobiles and light trucks. There are literally thousands of products available that are dedicated to enhancing the cosmetic appearance of a consumer's pride and joy, namely, his automobile. From products that add luster to an expensive paint job, to products that add sparkle to chrome, all one has to do is visit a local parts store to see discover a broad range of such innovative products.

One category of products possibly containing the least variety from which to choose is car-wash products. Car-wash accessories known in the art include special towels for removing water and drying automobile finishes after a car-wash, or chamois cloths for absorption of excess water and the like. Other products in this category include automated hot-air blowers for quick drying the automobile finish, or various hand-held cloth or synthetic pads for rubbing excess water off of an automobiles finish.

Bottled solutions or treatments are sometimes employed as aids to reducing spotting or staining of automobiles finish often resulting from standing water. The type of water used in washing a car plays a part in possible spotting or staining that may be present on an automobiles finish after a wash. For example, if the water is very hard (has a lot of dissolved minerals) minerals, resultant spotting can be extreme; whereas, if the water is softer, spotting may be lessened. These bottled solutions or pastes are designed to reduce spotting via their interaction with the water itself Further to the above, many professional detailers offer full-service hand washing and regular wash programs. One of the advantages of this type of service for the customer is that the vehicle is cleaned with a detailer's touch, which tends to be much more thorough than a standard car wash. One of the most useful products used by a professional detailer is a chemical/liquid spray-on wax product. Such multi-purpose products may be used for adding extra gloss to the finish of a vehicle after a full-service wash, for example, or for touching up the finish of the vehicle after an exterior detail job, showroom wiping and dry-washing.

Spray-on waxes were originally developed for the show vehicle industry, allowing technicians to quickly wipe dust and fingerprints off of the vehicles on display or in long-term storage. If the vehicle is never exposed to any substantial amount of direct sunlight, then the protection provided by occasional spray waxing is often sufficient. Spray waxes also provide the consumer with many similar advantages, one of which is providing a quick way to accomplish light surface cleaning of the vehicle's finish, such as removing dust and fingerprints, and so on.

Most spray waxes also have a high silicone content which helps to hide minor surface imperfections such as micro-scratches and the typical method of application, simply spraying on and wiping off, allows detailers and consumers alike to do all of this very quickly. The protective wax or silicone elements in typical spray-on products are solid in nature and are suspended in the water-based or chemical-based solution after thorough mixing of the product, and in general, the more solids to spray-on wax contains, the more cleaning and protective power to product will have. Higher solid content, however, also means that the spray-on wax will be more difficult to buff off using the conventional means of application and wiping off with a cloth or chamois.

An advantage for consumers in using such spray-on wax products is that the vehicle receives a protective coating that lasts typically one to two weeks, and the consumer is not required to pay the substantial cost of a complete exterior detail job. Properly applied, the application of spray-on wax products provides a finish on the vehicle which appears much shinier, with less visible micro-scratches, then it would if it was simply washed and dried.

Most spray-on cleaning and waxing products on the market today are simply water-based chemicals with a mild cleaning ability providing one to two weeks of protective value for the paint of the vehicle. Others are solvent-based and thus provide slightly more cleaning and protective abilities. Many manufacturers now carry a liquid spray wax designed just for cleaning the surface finish of the vehicle without water, the idea being that if the vehicle is not extensively dirty or muddy, a detailer can spray the dry-wash liquid directly onto the vehicle surface and wipe it off with a cloth or chamois, removing both the cleaner and any dirt that is on the surface. Such dry-washing products are usually the most effective cleaners and provide the longest protective durability, often lasting up to several months. Many dry-wash products also contain stronger protective elements, when compared to standard spray-on wax/cleaning products, some even containing an added liquefied polymer sealant, providing a protective durability that can range from several weeks to several months.

At the time of this patent application the most successful (least damaging) method known in the art for removing standing water from an automobile finish, and evenly distributing and wiping spray-on wax/cleaning products is likely the time-tested chamois. The chamois is a highly flexible section of treated animal skin that has a large absorption capability. The chamois is typically used just after the automobile has been rinsed. It is laid out on the surface and pulled in the direction of the user for removing standing water, and, in the case of spreading and buffing of sprayed-on wax, or similar spray-on products, is wiped in a back and forth or circular pattern in alternating directions.

Although the chamois cloth is widely accepted as a viable method for removing standing water and wiping sprayed-on wax products as described above, there are some inherent problems and limitations associated with its use. Because of the chamois cloth's persistent adhesion to a wet surface, moving the chamois from side to side, or at directions away from the user, such as when wiping sprayed-on wax products, is relatively difficult. The chamois cloth has a tendency to fold or roll under itself if it is not being pulled directly toward the user. This drawback limits accessibility to areas that may need to be wiped. Another problem is that, while a chamois is very successful in absorbing standing water and spreading spray-on wax, the chamois must be wrung out when it is loaded with water and/or spray-on wax products, and such cloths are difficult to wring.

Because of these difficulties several chamois cloths must often be used to completely remove standing water or other liquid materials from a vehicle finish. Although the chamois is very soft and generally harmless to a paint job or finish, it is possible that unseen dirt or particles left over from the car-wash process get lodged in the chamois and can cause scratches when the chamois is pulled across, or otherwise wiped across the surface of an automobile This can be particularly disturbing for those who own expensive show cars that support special auto paints that may be susceptible to scratching.

Moreover, if a spray-on wax is applied to the wet surfaces of the vehicle just after washing, or is applied to a dry just-washed surface, a first cloth or chamois (or set thereof) is required for spreading the sprayed-on wax product, which may be mixed with the standing water (or not, in the case of dry-washing/waxing), and a second set of cloths/chamois is required to finally wipe and buff the waxed finish to a shine.

It is well-known in the art that a typical painted surface of a vehicle, although it may appear perfectly smooth to the naked eye, is actually quite porous, containing many tiny pores in the form of valleys and crevices. This is especially apparent when the painted surface is viewed under very high magnification. An inherent problem in using a cloth or chamois for spreading and buffing spray-on wax products is that, since the wiping and buffing, process must typically occur very quickly after application of the spray-on wax because of rapid evaporation of the very thin layer of water and/or carrier solution, the protective wax solids which are suspended in the carrier solution do not have the opportunity to settle into the pores, and also are not effectively forced into the porous surfaces of the paint surface by the wiping action of a cloth or chamois. Many of the tiny wax solids will tend to be collected by the cloth or chamois instead of desirably being forced into the pores and thereby creating a glossier finish.

Other types of cloths are available and well known in the art, such as re-washable towels that are sold in most autocare shops. The absorption qualities, as well as the scratch resistant properties of these products typically vary. These towel-type products are generally intended for users who expect marginal results and are not overly concerned with the cosmetic appearance of their automobiles. Similarly, hand-held pads of the type made out of synthetic fiber vary in their absorption quality, as well as scratch resistant properties. While hand-held pads provide a convenient place for a user's hand (usually straps on the top surface), they do little else to improve the technology of water removal or evenly distributing spray-on wax products and enabling the wax solids to more completely fill the tiny pores of the paint.

It is well known in the art that some products with rubber-like blades, such as squeegees and windshield wipers, work fairly well removing water from a flat or slightly curved surface. These devices, however, are not well adapted to removal of standing water from automobile bodies, because they cannot conform to the sometimes radical and compound curvature of an automobile body. Moreover, many body panels for vehicles such as trucks and airplanes have uneven surfaces, such as broken by rivet heads and the like, and also by intentional functional or ornamental patterns. One such pattern is a diamond shape panel that is well-known in the art and used for truck trailers and the like. Wipers are not known in the art that are efficient in removing standing water from such surfaces.

Air blowers are sometimes employed to evaporate standing water droplets on a surface. This method is most used in automated car washes and the like; and it is well known in the art that an automobile owner concerned with the cosmetic appeal of his or her vehicle would not, under normal circumstances, patronize a commercial auto-wash. Moreover, air blowers of the type that are hand-held are typically difficult because they are cumbersome, awkward, and rather heavy to hold for the time it takes to dry a car body. Furthermore, power cords can get in the way while working on an automobile surface, and cause scratches and other damage as well. In addition, electricity and or battery costs may be a deterrent to those having to wash multiple automobiles such as would be the case with a car dealership, etc.

What is clearly needed is a method and apparatus for removing standing water from surfaces that is adapted to conform around the sometimes compound and radical curvature of the outer surface of the bodies of automobiles, trucks, boats, airplanes and many other types of vehicle surfaces, as well as other such finished surfaces having similarly compound and radical curvature, bumps, rivet heads and other such protrusions from surfaces to be dried, and is at the same time gentle to surface finishes, easy to use, inexpensive, and durable. Such an apparatus is further provided with a grasping handle that provides a comfortable and natural grip posture for the user, while at the same time providing a secure and slip-resistant gripping surface enabling the user to securely and comfortably grasp the apparatus, particularly useful when the surface of the gripping portion of a handle of the apparatus is wet with water or slippery automotive cleaning or wax products. The method and apparatus in various embodiments is also enabled for evenly spreading spray-on wax or other such vehicle finish products that are sprayed on a wet or dry just-washed painted surface, while significantly improving the application of the distributed wax or other such solids down into the pores of the paint. It is to these objects and others that the present invention is dedicated, and apparatus and methods are taught herein in enabling detail for accomplishing these ends.

SUMMARY OF THE INVENTION

In a preferred embodiment of the present invention a water-wiping apparatus for wiping standing water from a curved surface is provided, comprising a flexible panel of a first height, with an upper long edge of a first length and a lower long edge of a second length, greater than the first length, the upper long edge centered on the length of the lower long edge, a substantially rigid handle having a length substantially equal to the first length attached along the upper long edge, and a lip formed along the lower edge, extending to one side of the flexible panel and ending in a sharp line at the end away from the flexible panel. Also in a preferred the lip has a triangular cross-section in a plane cutting the panel orthogonal to the length and parallel to the height, and in some embodiments the lip preferably joins the flexible panel at an angle equal or less than thirty degrees.

In some embodiments each end of the upper long edge of the flexible panel is joined to the closest end of the lower long edge by a smooth, curved shape, the shape mirrored at each end of the panel. Also in some embodiments the handle is symmetrical about a central plane common to the panel, and has two sides corresponding to opposite sides of the panel, further comprising an upper and a lower longitudinal ridge on each side of the handle, the ridges spaced apart to form a longitudinal groove to engage a user's fingers or thumb, providing a sure grip for the user on the handle. In some cases the lip extends to both sides of the flexible panel.

In some preferred embodiments the upper longitudinal ridge on each side of the handle extends from the central plane of symmetry to a greater extent than does the lower longitudinal ridge, and in some embodiments the handle further comprises an interface for attaching a handle extension. In yet other embodiments the opposite ends of the handle are rounded, presenting a substantially curved outward surface toward the ends of the apparatus, to avoid damaging contact with surfaces being wiped.

In another aspect of the invention a blade insert for a water-wiping apparatus is provided, comprising a flexible panel of a first height, with an upper long edge of a first length and a lower long edge of a second length, greater than the first length, the upper long edge centered on the length of the lower long edge, a handle interface along the upper long edge adapted to join the flexible panel to a rigid handle, and a lip formed along the lower edge, extending to one side of the flexible panel and ending in a sharp line at the end away from the flexible panel.

In some embodiments of the blade insert has a triangular cross-section in a plane cutting the panel orthogonal to the length and parallel to the height, and in some embodiments the lip joins the flexible panel at an angle equal or less than thirty degrees. Also in some embodiments each end of the upper long edge of the flexible panel is joined to the closest end of the lower long edge by a smooth, curved shape, the shape mirrored at each end of the panel. In some cases the lip extends to both sides of the flexible panel.

BRIEF DESCRIPTION OF THE DRAWING FIGURES

FIG. 7A is a perspective view of the water blade of FIG. 1 displacing water from a diamond plate surface according to an embodiment of the present invention.

FIG. 7B is an elevation view of the water blade and diamond plate of FIG. 7A.

DESCRIPTION OF THE PREFERRED EMBODIMENTS

Figure 1:
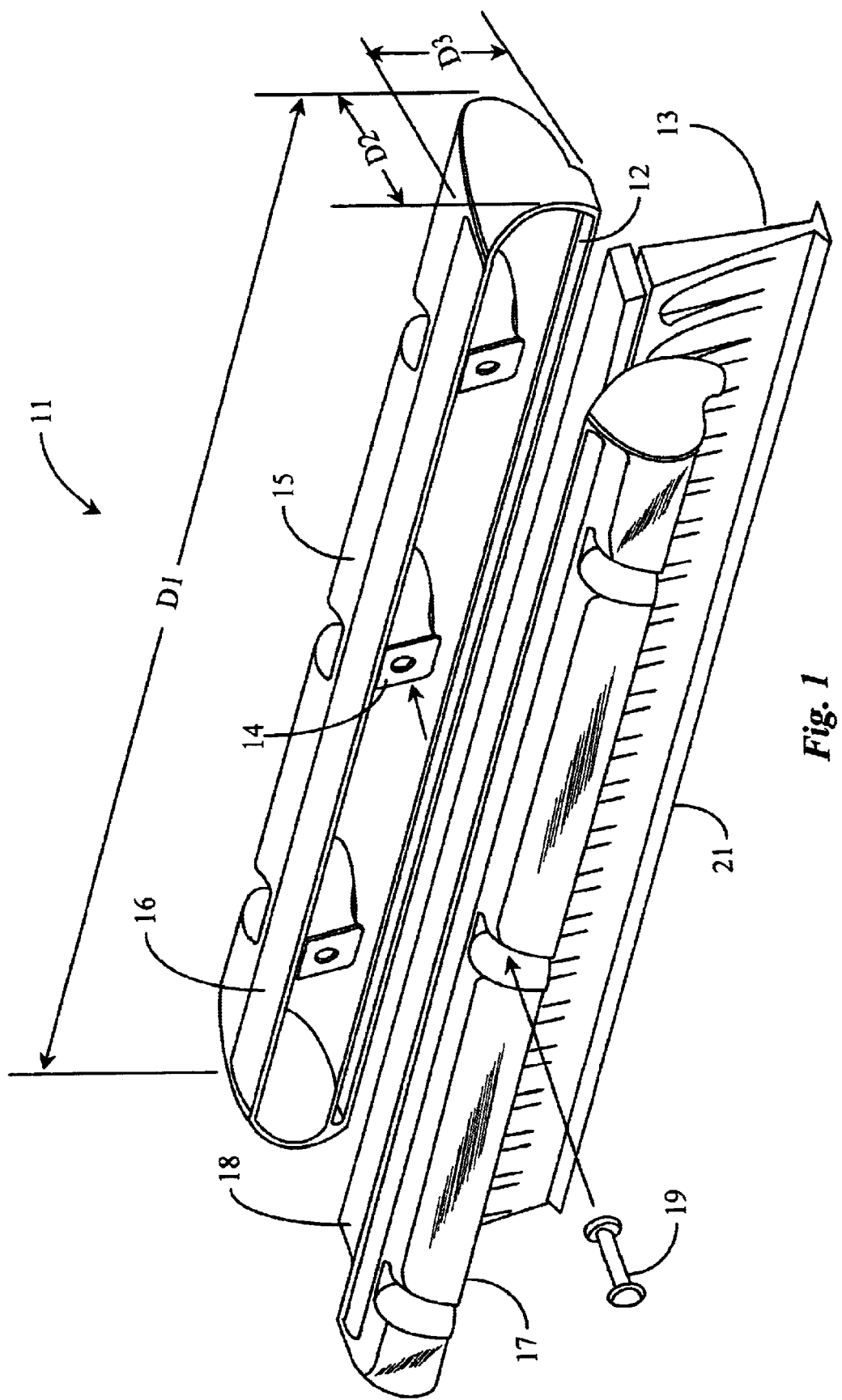
FIG. 1 is a perspective exploded view of a hand-held water blade in an embodiment of the present invention.

FIG. 1 is a perspective exploded view of a hand-held water blade 11 in an embodiment of the present invention, illustrating three main elements of the assembly of water blade 11. A two-part handle consists of a first section 15 adapted to fasten to a second section 17 with a blade insert 13 captured between the handle sections. With the handle sections joined and the blade captured, a functioning water blade 11 is formed. In a preferred embodiment of the present invention, handle sections 15 and 17 are molded from polypropylene in an injection molding process. Injection molding is well known in the art of fabricating various plastics and is considered by the inventor, in this instance, to be a preferred process for manufacturing water blade 11. In other embodiments, other fabrication methods may be employed such as gluing various parts together, or perhaps plastic welding techniques may be employed. It will be apparent to one with skill in the art that various materials may be used to fabricate handle sections 15 and 17 such as Delrin, nylon, and others. Metals, wood, and the like may be used in other embodiments.

A T-shaped top portion 18 is provided in blade insert 13 wherein opposite sides of the "T" fit snugly into opposite blade slots provided in handle sections 17 and 15. A blade retaining slot 12 is shown in handle section 15, and a similar slot is provided in section 17, though not shown in FIG. 1.

Handle sections 15 and 17 are designed to fit together to form a handle grip that retains the wiper blade, is comfortable to hold, and is of light weight. In a preferred embodiment, special texture areas are provided around the outer edges of each handle section, although this is not required. Recesses may be molded into handle sections 15 and 17 for the purpose of supporting decals, logos, and the like.

In the embodiment shown a method is provided for attachment of handle sections 15 and 17 whereby handle section 15 has assembly brackets such as bracket 14 that are designed to accept rivets such as rivet 19 that are to be inserted through access points shown in handle section 17, such as the access point shown roughly in line with rivet 19 and bracket 14 illustrated by the directional arrows. Bracket 14 may be formed in the molding process or may be mounted to handle section 15 after molding. Bracket 14 may be fabricated from aluminum, sheet metal, or any other suitable material known in the art and of suitable strength to provide a secure attachment.

In the embodiment shown by FIG. 1 the method of attachment is riveting. However, other methods of attachment may be used as well, such as screws, snap inserts and the like. In another embodiment there may be no brackets or recesses but rather grooves provided and adapted for the installation of outer snap rings. It will be apparent to one with skill in the art that many methods, well known in the art, may be employed for attaching handle sections together without departing from the spirit and scope of the present invention as described above. In still other embodiments a one-piece handle may be provided with a T-slot adapted to engage T-section 18 of blade 13, wherein the blade may be threaded into the slot of the one-piece handle. An advantage in this embodiment is that there is no need for separate sections or fasteners. In still other embodiments handles may be formed in other ways, ad some of these other ways are described in more detail below.

Figure 2:
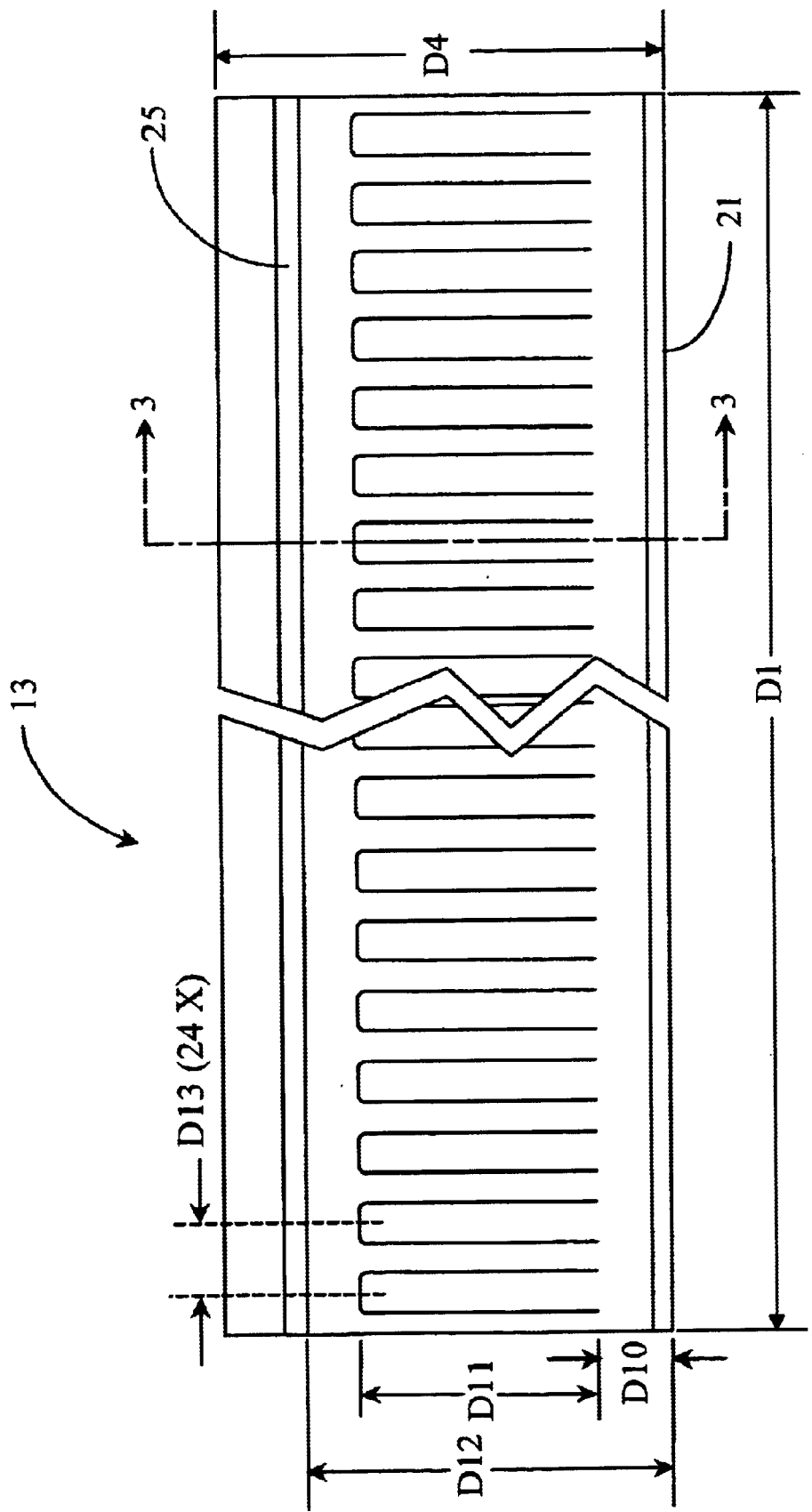
FIG. 2 is a broken view of a water blade insert in an embodiment of the present invention.
Figure 3:
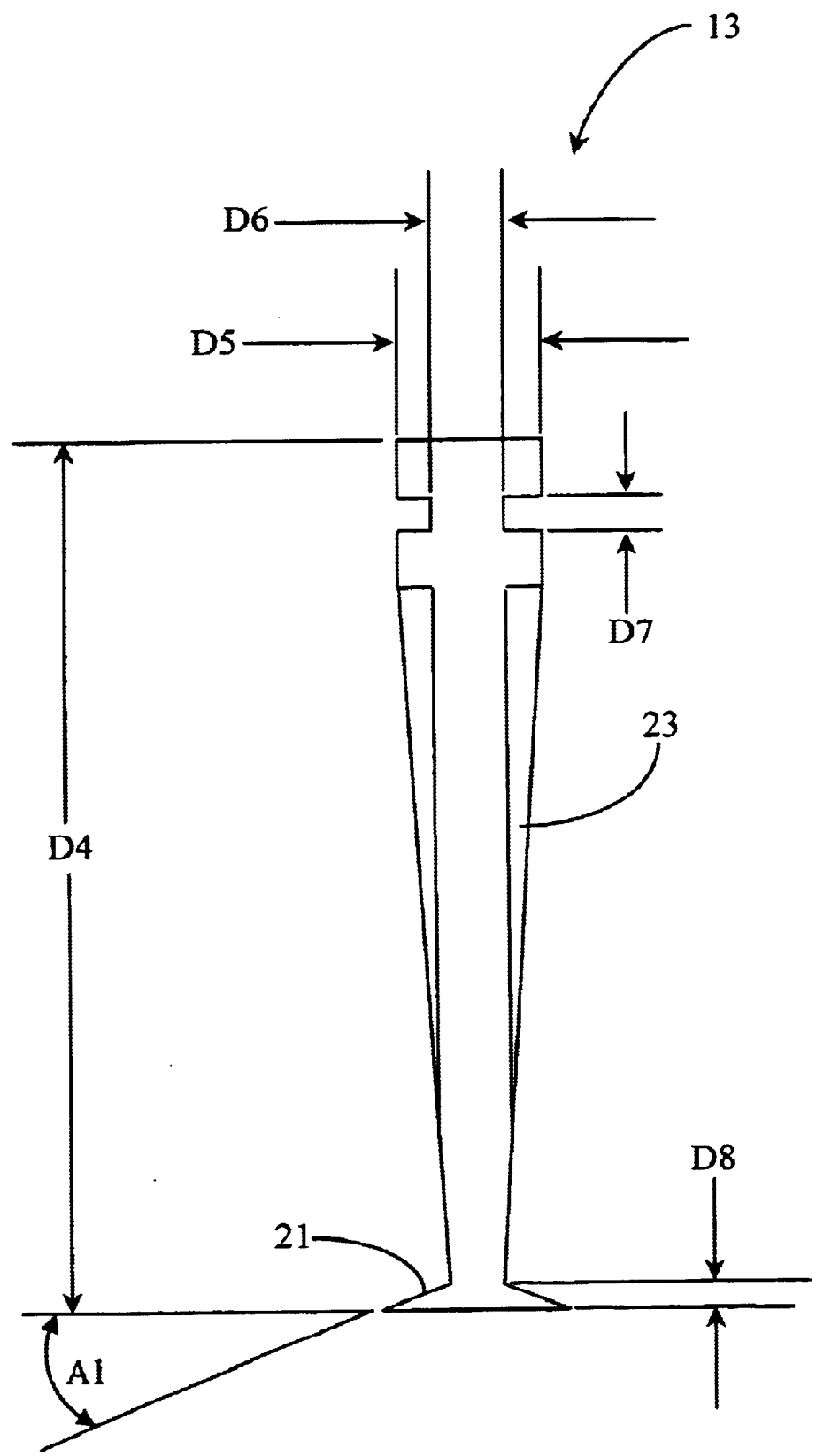
FIG. 3 is a cross section view of the water blade insert of FIG. 2 taken along section line 3—3 of FIG. 2 in an embodiment of the present invention.

In a preferred embodiment of the present invention length dimension D1 is about 12 inches, width dimension D2 is approximately ⅞ of an inch, and height dimension D3 is approximately 1¼ of an inch. It will be apparent to one with skill in the art that dimensions with respect to length, width, and height of the grip handle formed by handle sections 15 and 17 may vary. For example, handles of different sizes may be provided along with blades of different sizes for use under certain circumstances. Large sizes for large trucks and trailers, for example, and smaller models for such as compact cars FIG. 2 is a broken elevation view of blade insert 13 of FIG. 1 in an embodiment of the present invention showing approximate dimensions and various molded features, some of which are important to unique functionality of wiper blades in embodiments of the present invention. FIG. 3 is a section view of blade insert 13 taken along section lines 3–3 of FIG. 2 wherein further dimensioning is illustrated.

A lip region 21 is provided along the longitudinal bottom edge of blade insert 13 with lip elements extending laterally from the bottom edge. This lip region may be formed in several different ways in different embodiments of the invention. In a preferred embodiment the lip region is formed at an angle from the blade element as described below in more detail.

In a preferred embodiment of the present invention blade insert 13 is molded from a silicon rubber material via injection molding process for similar reasons stated as stated above with respect to the molding of handle sections 17 and 15. It will be apparent to one with skill in the art that blade insert 13 may be molded from other materials known in the art and of suitable flexibility. In this instant embodiment, the inventor prefers silicon rubber with a flexibility rating of approximately 30 to 70 durometer, depending on thickness of the blade. The flexibility of blade insert 13 can be more or less than 30 to 70 durometer, depending on a number of factors that also affect functionality, such as blade thickness, taper, grooving, blade height, and the like.

A unique and critical function provided by unique characteristics of blade insert 13 is its capability of conforming around sometimes compound and/or radical curves in the body of an automobile, such as in a fender section. It is an object of the present invention is to provide for eliminating standing water in these areas in a safe and efficient manner. This unique capability is made possible in part by the approximate dimensional proportions of blade insert 13 with respect to length and height.

Referring to FIG. 2 and FIG. 3, blade 13 has a height D4 that is a significant fraction of length D1. The ability of blade 13 to form around curved surfaces in wiping water from such surfaces is largely due to the height of the blade relative to the length, and this feature is enlarged upon below. In one preferred embodiment of the present invention, D12, which is the effective height of the blade extending from a handle, is about 2½ inches. This dimension is the free flexible height from bottom of blade insert 13 to the bottom of the grip handle formed by handle sections 15 and 17 of FIG. 1. In this embodiment D1 is about 12 inches. The ratio of free height to length in this case is about 0.21, or about 20 twenty percent. The inventor has discovered empirically that this ratio need to be about ten percent or more for the water blade to be really useful for automobiles with considerable curved surfaces.

It will be understood that D1 is used in this embodiment both as the length of the handle sections and the wiper blade, as the lengths are substantially the same. In some other embodiments handle elements and wiper blades will be of different dimensions. It is been found by experiment that in this embodiment, the dimensions 2.5 inches for height D12 and 12 inches for D1, with a thickness of material of approximately 3/16 of an inch produces a useful and preferable result. In other embodiments wherein the overall dimensions of water blade 11 are larger or smaller, a material with a more suitable hardness and perhaps thickness may be employed to aid in achieving desirable flexing properties of water blade 11.

Providing a significant height for blade insert 13 increases the area of contact around a curved automobiles surface such as a fender, and the like. The ratio of height to length of blade insert 13 is important to the function of water blades in various embodiments of the present invention, and will be described in more detail in below.

Another important characteristic in blade insert 13 is a capability to direct standing water from a surface and to move it in an efficient manner whereby virtually no water residue remains behind on the automobile surface. This directing effect is accomplished by lip 21 which is formed along the longitudinal bottom edge of blade insert 13 and extends in the embodiment shown in the form of a tapered angle on either side. Angled lip 21 produces a rolling action to the water and forces it to ride up on the angled surface of the lip effectively separating the water from the surface of the automobile. It is known to the inventor that some windshield wiper blades incorporate a similar design, and it is well known in the art that this design is effective in removing standing water.

The angled lip characteristic is unique in conjunction with the height of the blade, in providing a lipped blade with an ability to conform to compound and radical curves in the surface of an automobile.

In the embodiment shown in the figures a series of molded indentions is provided along the length of blade insert 13. The object of these indentions is to minimize the amount of material required to mold blade insert 13. It is known in the art that silicon rubber is relatively expensive when compared to other materials, therefore, considerable savings can be realized by employing such material reducing techniques. In the embodiment shown these indentions are equally spaced approximately ½ inch (D13) from center line to center, for 24 indentions. The uniform height of these indentions is approximately 1⅞ inches (D11), and the dimension from the bottom of the indentions to the bottom of blade insert 13 is approximately ½ of an inch (D10).

Even though indentions as described immediately above may be used for saving weight and material volume, in most preferred embodiments the sides of blade 13 are smooth, rather than grooved, and the inventor has found that the smooth embodiment actually provides enhanced water-wiping function compared to blades with the grooved surface.

A groove 25 is shown running the entire length of blade insert 13. Groove 25, described briefly with reference to FIG. 1, is formed around the perimeter of blade insert 13, providing the shape of T-section 18. These grooves provide a secure locking arrangement when handle sections 15 and 17 of FIG. 1 are closed, thereby stopping blade insert 13 from moving up or down with respect to the grip handle.

The overall thickness of blade insert 13 is approximately ½ of an inch (D5). A minor thickness of blade insert 13 shown from the inside diameter of T-slot 25 and extending down to the upper shoulder of angled lip 21 is approximately 3/16 of an inch (D6). Overall height of blade insert 13 is approximately 2 and ⅞ inches (D4). The width of grooves 25 of and the height of angled lip 21 are approximately ⅛ of an inch (D7 and D8 respectively). The approximate angle of angled lip 21 in the preferred embodiment shown is 30 degrees (A1). In some embodiments the angle at which lip 21 joins the body of the blade is different, and in some embodiments the lip may be on one side only. The inventor has found that a sharp edge at the end of lip 21 provides a superior wiping action.

Various dimensions as described herein are approximate only and are meant to illustrate preferred size relationships of features of blade insert 13 in a preferred embodiment of the present invention. It will be apparent to one with skill in the art that many changes can be made with respect to dimensioning water blade 11 without departing from the spirit and scope of the present invention. For example, a larger water blade may be used on a larger vehicle such as a semi-trailer rig and so on. In one embodiment a water blade with an added height to its blade insert may be used, for example, if a particular type of vehicle contains more curved features that are pronounced.

Figure 4A:
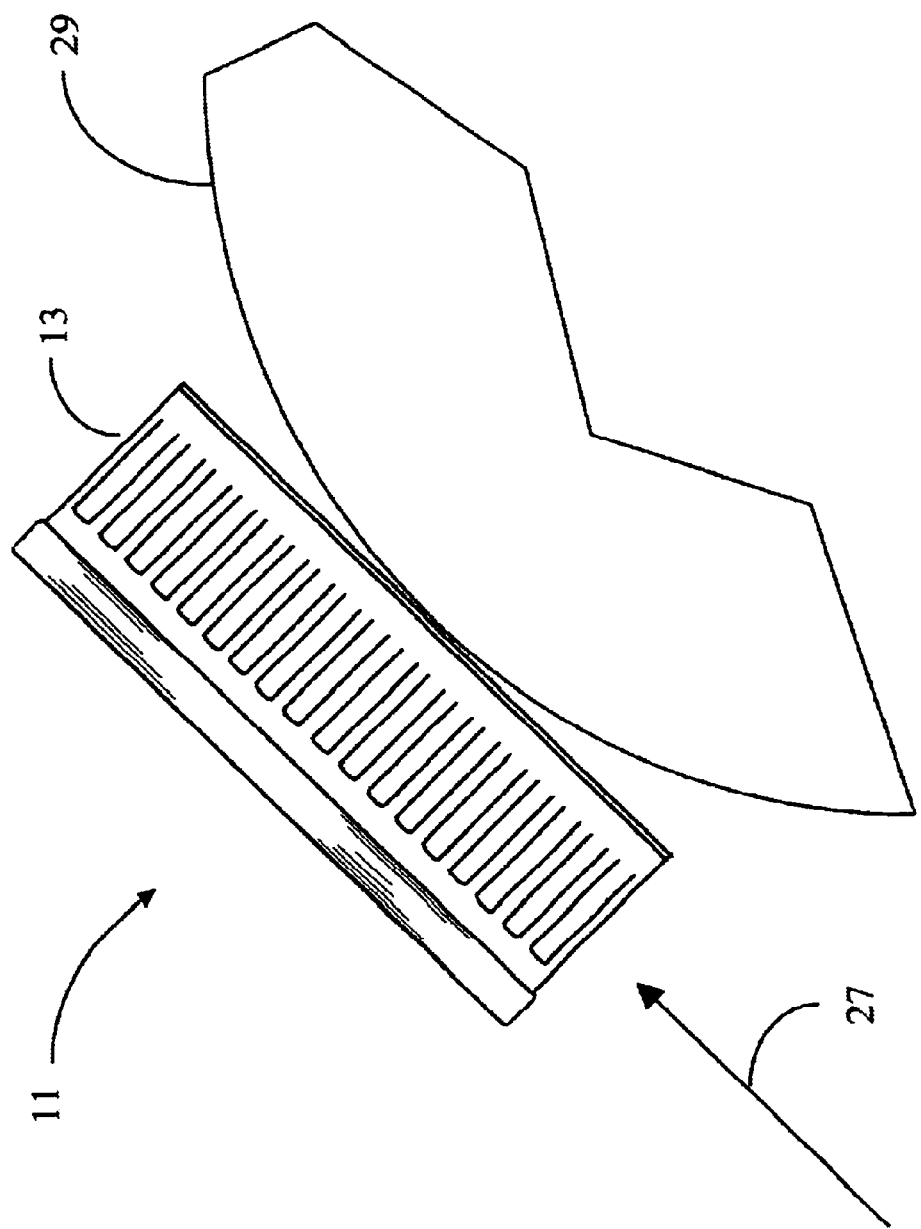
FIG. 4A is a perspective view of the water blade of FIG. 1 applied to a curved surface, with the blade just touching the surface.
Figure 4B:
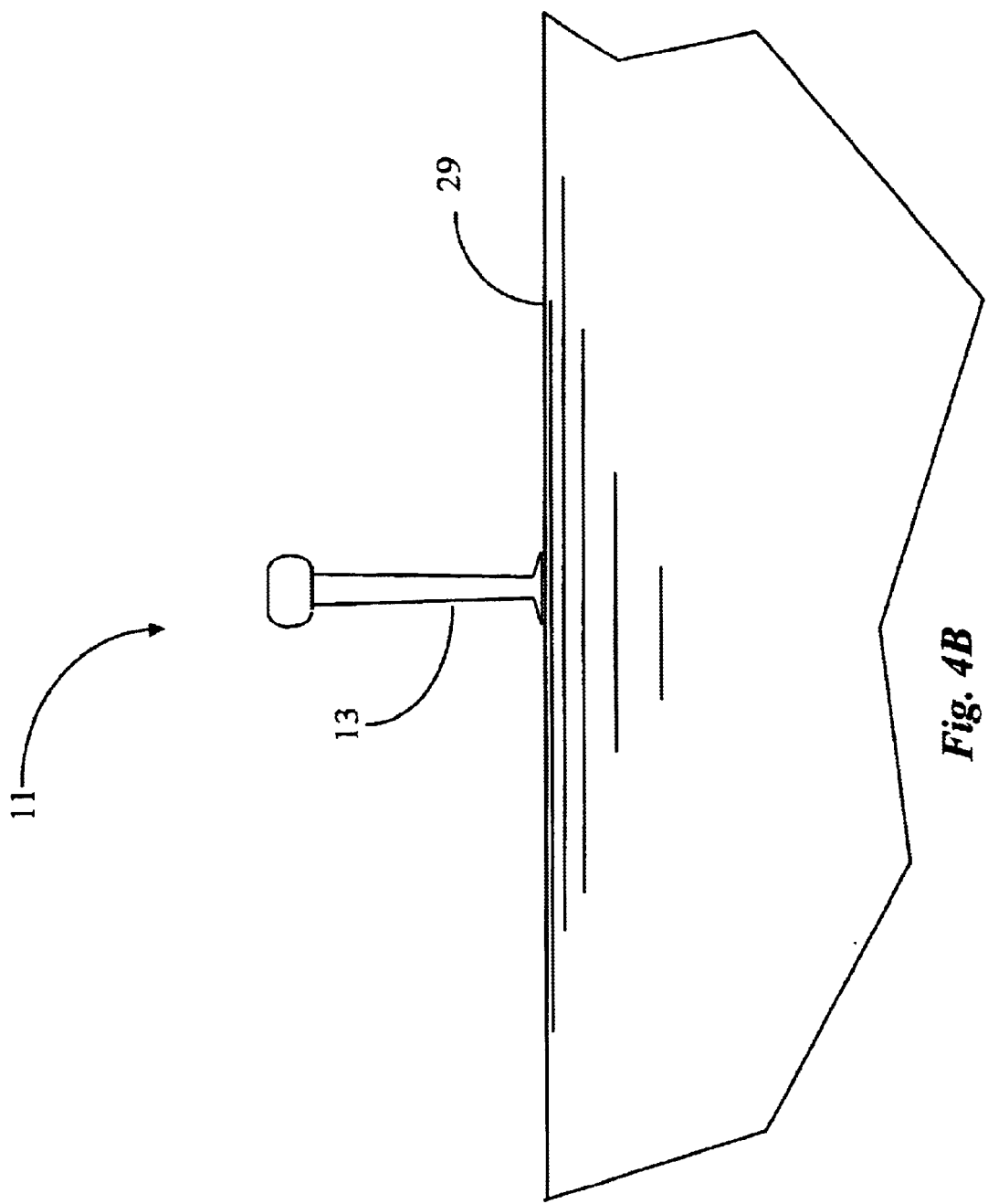
FIG. 4B is a view of the blade and surface of FIG. 4A from a different vantage.
Figure 4C:
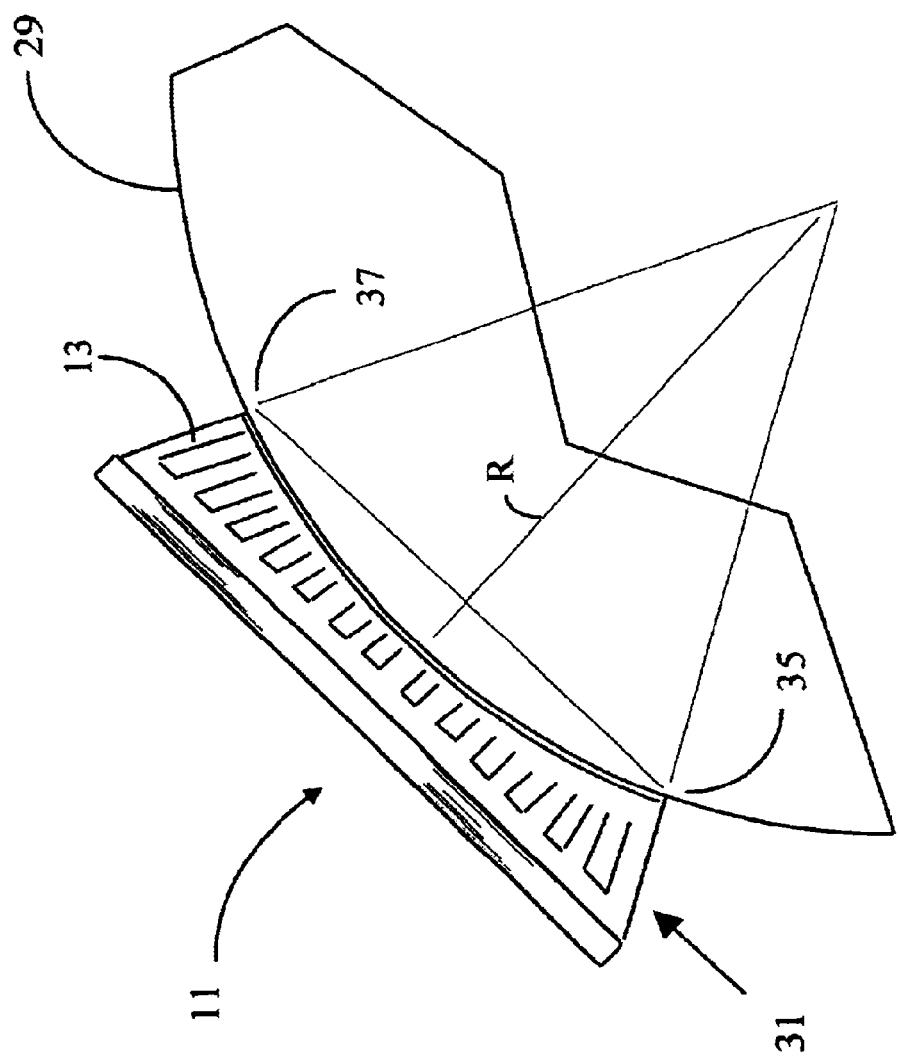
FIG. 4C is a perspective view of the blade of FIGS. 4a and 4B with the blade urged into the surface.

FIGS. 4A–4C illustrate the unique action of water blade 13 in conforming to a curved surface 29. FIG. 4A illustrates a section view of a curved surface, which could be the curvature of a fender, and a water blade 11 including a rigid handle positioned so that lip 21 is just in contact with the curved surface, but flexible blade element 13 is not deformed. FIG. 4B is a view in the direction of arrow 27 of FIG. 4A, showing water blade 11 in contact with curved surface with blade element 13 not deformed. In this example, the contact of the blade element with the surface is just a narrow line. This is the situation that will always exist with a blade having little or no height D12(FIG. 2).

Figure 4D:
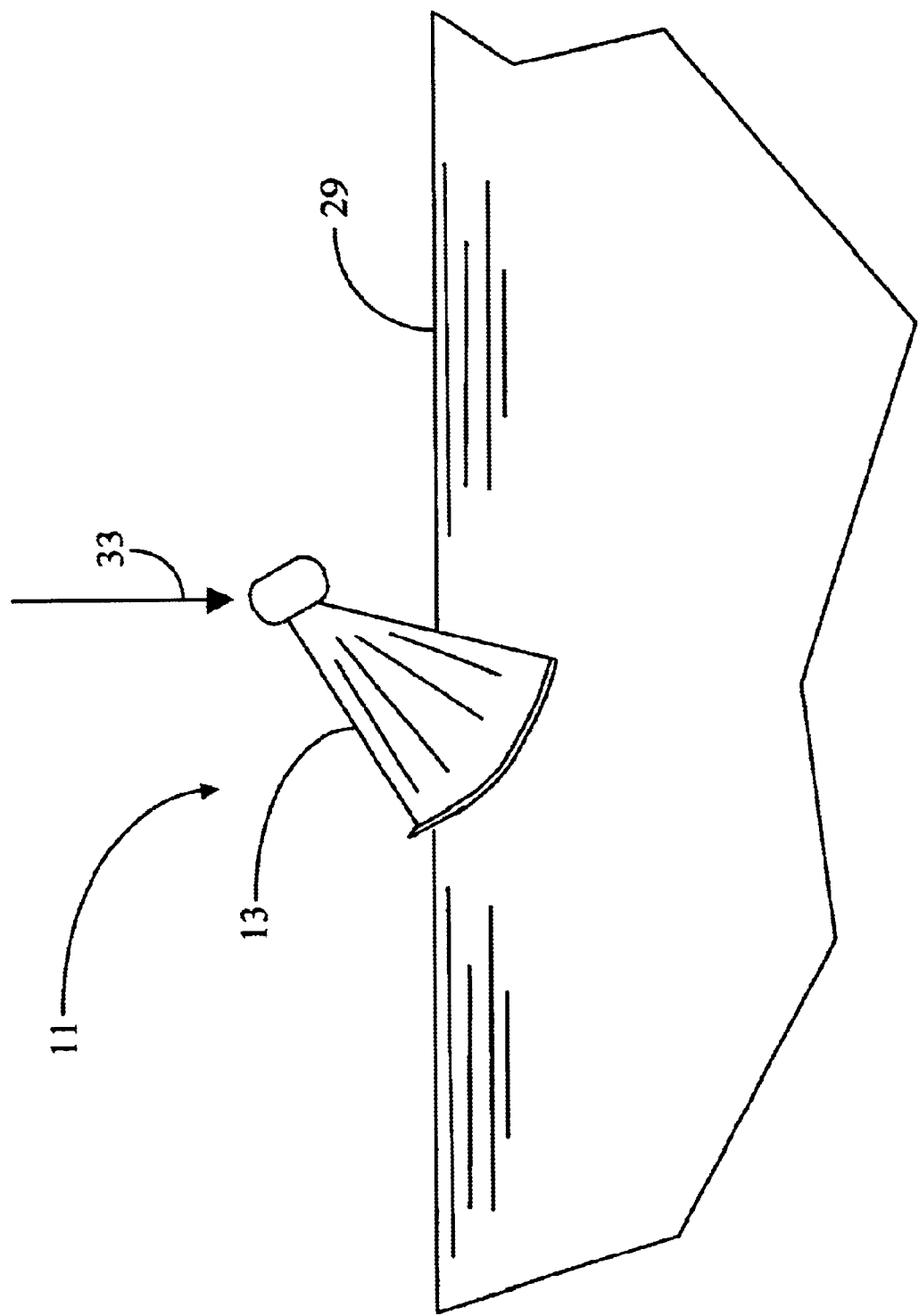
FIG. 4D is a view of the blade and surface of FIG. 4C from a different vantage.

FIG. 4C is the same section view of a curved surface 29 as shown in FIG. 4a, with water blade 11 in contact with surface 29, and FIG. 4D is a view in the direction of arrow 31. In this example, blade 11 has been rotated somewhat around the longitudinal axis of the handle, and the blade has been urged toward curved surface 29 in the direction of arrow 33. This movement is applied by a user holding the blade in his or her hand.

The result of moving the water blade into surface 29 is deformation of blade element 11, bringing the sharp edge of lip region 21 into contact with the surface, and causing flexible blade element 13 to wrap around the curvature of the surface to a significant degree. In this example, width of the contact area (FIG. 4C) is from point 35 to point 37. The significantly wide contact line around the curvature of the surface is a result of the height D12 (FIG. 2) of flexible blade element 13.

The arc length that may be accomplished by blade element 13 around a curved surface in practicing the present invention is a function of both the height of the blade element and the curvature of the surface. As surface curvature may be varied and compound, rather than simple, the calculations can be complex. A simplified example is given here assuming that the curvature is circular of radius R.

Given radius R for the curvature of the surface, and a height H for dimension D12 of blade element 13, and assuming that the water blade is urged into the curved surface until the handle is proximate the surface (which is a max situation, not actually encountered in practice), the angle α can be determined by the formula:

$$\sin \alpha = (R-H)/R$$

The potential length of the contact line to the curved surface from point 35 to point 37 in this situation can then be calculated as that portion of the circumference of a circle of radius R subtended by twice the angle α taken around the center of the curvature.

It is apparent in the above analysis that for the potential length of the contact line to be realized, the overall length of the flexible blade element must be at least equal to the potential length. If the length of the blade element is more than the potential contact length, then part of the blade element will not make contact, as is shown in FIG. 4C. As is described above, in the preferred embodiment shown, the height of the blade element is about 3 inches, and the length is about 12 inches. This relationship has been found by the inventor to be useful for most automobile bodies.

Figure 5A:
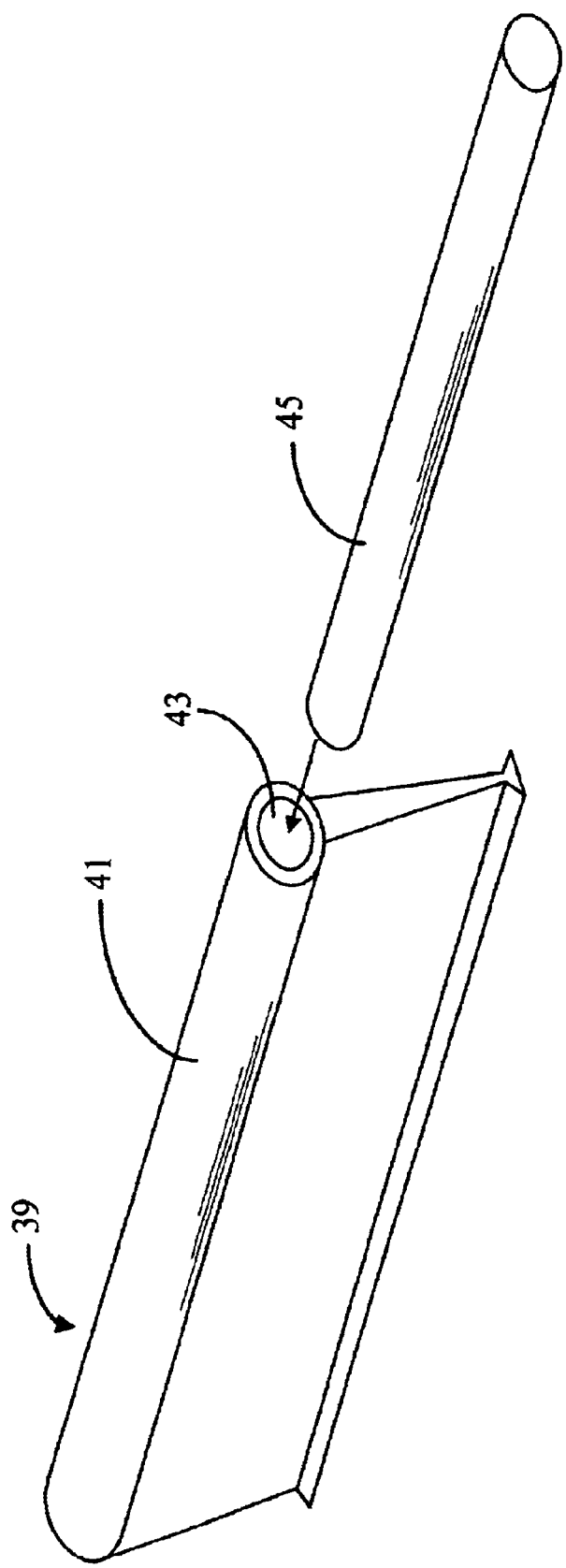
FIG. 5A is a perspective view of an alternative embodiment according to the invention, including a molded passage and insert for a rigid handle.

It will be apparent to those with skill in the art that there are many alterations that might be made in the embodiments shown and described without departing from the spirit and scope of the present invention. In the area of handle provision for water blades in particular, many variations have been developed. FIG. 5A is a perspective view of one such alternative embodiment. In FIG. 5A a water blade 39 according to an embodiment of the present invention is molded from material such as silicone material of a single durometer, and a handle portion 41 is molded integrally from the same material. In the molding process a lengthwise passage 43 opening to either or both ends is molded into the water blade. After molding a rigid stiffener 45 of about the length of the water blade is inserted into the lengthwise passage, and provides rigidity and the function of the rigid handle added according to FIG. 1.

Figure 5B:
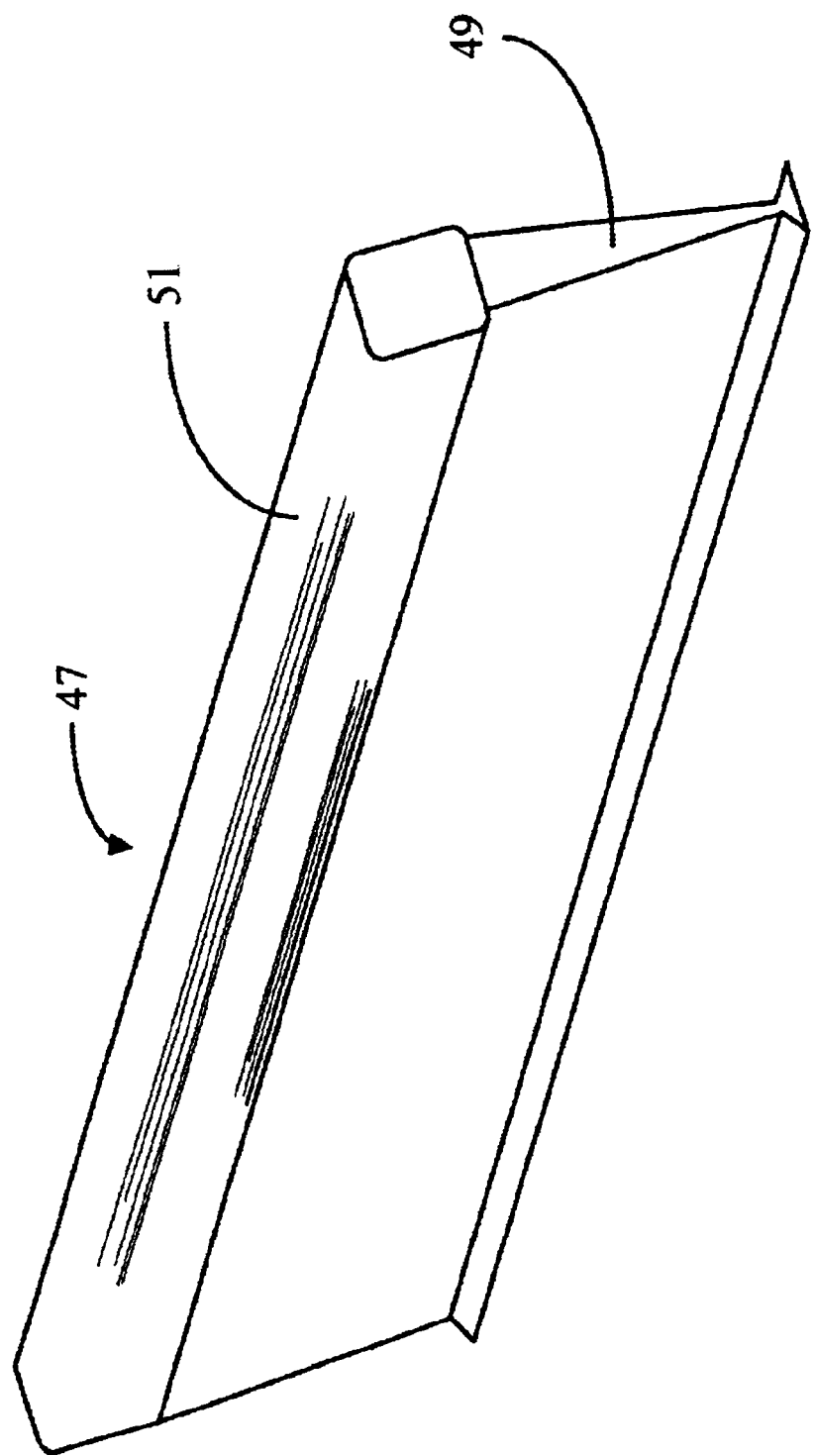
FIG. 5B is a perspective view of a two-part molded blade and handle according to an alternative embodiment of the present invention.

FIG. 5B shows yet another handle alternative for a water blade 47. In the embodiment of FIG. 5B material of two different durometers are molded in one mold. A blade region 49 is molded of a material soft enough for the needed flexibility, and a more rigid material is molded as a handle region 51. Procedures for such molding are well-known 1 the art.

Effective Water Removal (Displacement) over Rivets and other Projections

In another aspect of the invention, the lip area of water blade insert 13, shown as element 21 in FIG. 1, is especially implemented to provide for effective water removal (displacement) when used on surfaces that have projections emanating from the surface, such as rivet heads, raised ornamental patterns, and the like.

Figure 6:
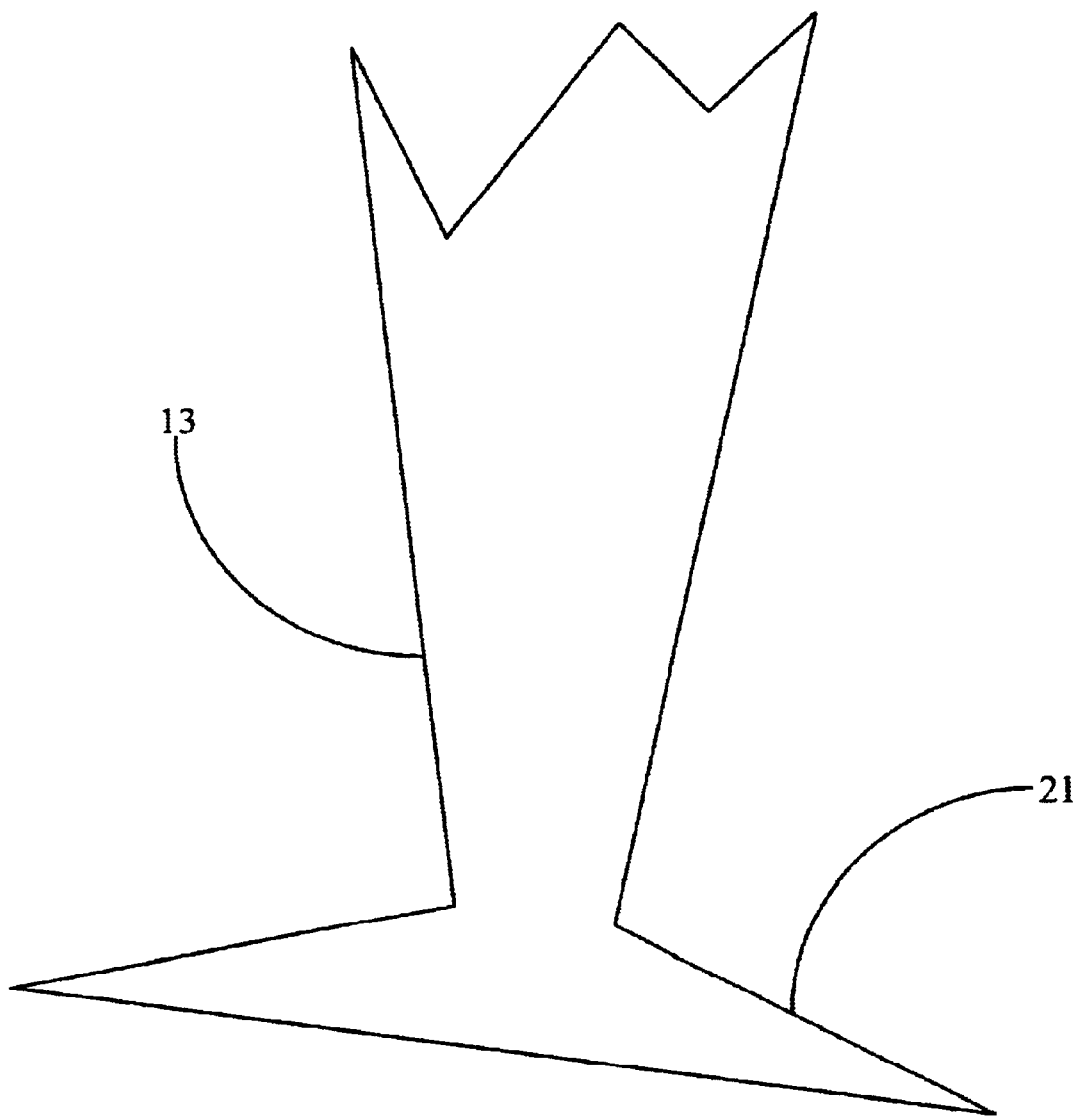
FIG. 6 is an end view of the lip area of the water blade of FIG. 1 according to an embodiment of the present invention.

FIG. 6 is an exploded and broken view of lip 21 of water blade insert 13 of FIG. 1 according to an embodiment of the present invention wherein lip 21 is not orthogonal to the height of the blade, but at other than a right angle.

It was mentioned above that some windshield wiper blades, known to the inventor, have lip regions that are similar in design to lip 21 of FIG. 1, and are known to be effective for removing standing water. However, it is also known and accepted in the art that a windshield wiper is limited by design and rigidity of material in that it is effective for a slightly curved and smooth surface such as a windshield. It was also mentioned above that the shape of lip 21 combined with the height of blade insert 13 is unique in it's ability to conform to and remove water from compound and radical curves in the surface of an automobile. This unique capability of water removal inherent to lip 21, as previously taught, is not limited only to contours and curves such as are common to surfaces of automobiles, trucks and other vehicles, but also extends, in some embodiments, to projections from surfaces as found in rivets, diamond plate, and other ornamental features found on some automobile surfaces, airplane surfaces, truck surfaces, and many other like surfaces that may or may not be associated with a type of vehicle, as is taught below.

The flexing capabilities of blade insert 13 and lip 21 also play a major roll in the ability of water blade 11 to remove water from more difficult surfaces such as surfaces exhibiting rivet heads, diamond pattern, and so forth. For example, with the applied action of water blade 11 over a given surface that may be contoured and have a raised pattern such as a diamond head pattern, blade insert 13 will conform to the contour while the contact side of lip 21 will conform to and around the edges of the diamond pattern effectively removing water. Lip 21, for example, may be specially designed with the required length (extension from the body of blade 13) for extending more than the total raised height of an ornamental pattern or an array of rivets and so on.

The inventor has discovered that an important factor in the ability of a lip, such as lip 21, to conform to raised elements in a surface to be wiped, such as rivet heads and diamond patterns mentioned, is the included angle of the lip at the apex of the lip. Depending on the nature of the raised surface to be wiped, the angle needs to be 30 degrees or less. In some cases the angle needs to be no more than 20 degrees. The actual angle that works in some cases is a function also of the length of the lip from the body of the wiper blade, and of the flexibility (softness) of the material of the lip. For a simple lip of substantially triangular shape, an extension from the body of about 3/16 inches, and a durometer of about 30, an angle of from between 10 and 20 degrees is best. An included angle of more than 30 degrees is not very useful, and the angle needs to be less than thirty degrees.

FIG. 7A is a perspective view of the water blade of FIG. 1 removing (displacing) water from a surface having rivet-head projections according to an embodiment of the present invention. In this embodiment, a user urges water blade 11 across a surface 61 having projecting rivet heads 63 in the direction of the arrows while, at the same time, keeping a sufficient downward force on surface 61 to cause the lip to conform to the shape of the raised rivet heads. As one side (contact side) of lip 21 passes over a rivet head 63, the flexible material conforms to the shape of each of the raised regions. In this fashion, water is displaced from all areas exposed to lip 21 including regions in between raised rivet heads of surface 61.

FIG. 7B is an elevation view of water blade 11 and rivet-studded surface 61 of FIG. 7A. When viewing water blade 11 and surface 61 in the direction of motion as indicated by the directional arrows of FIG. 7A, one can see how tightly lip 21 conforms around raised regions such as those present on surface 61. This unique ability is due to the flexibility of the material and design of lip 21 wherein sufficient length and flexibility is provided for conforming around such shapes. It will be apparent to the skilled artisan that one angular side or potion of lip 21 may be formed of a substantially greater length than the opposing side so that dual use is provided to water blade 11 without departing from the spirit and scope of the present invention. For example, one side having a longer extension may be used for surfaces having raised regions while the opposing shorter side is used for smooth surfaces and so on. In alternative embodiments alternate designs are provided to the lip section of blade 11 to conform to even more complex surface features as taught below.

Figure 8A:
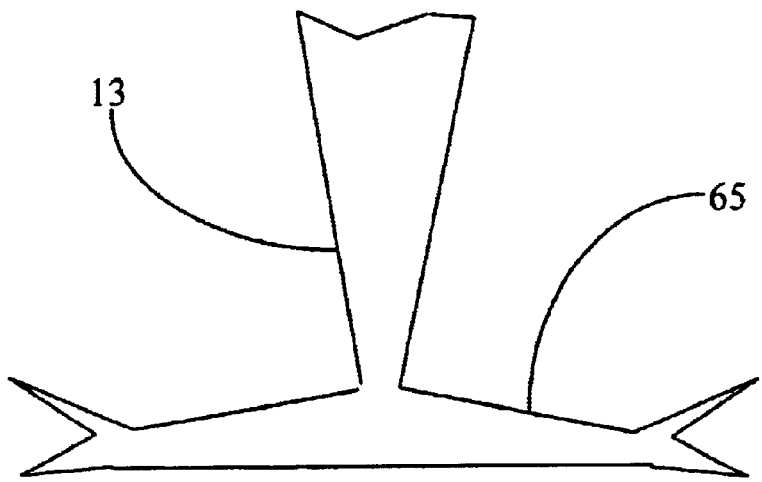
FIG. 8A is an end view of a lip design according to another embodiment of the present invention.

FIG. 8A is an end view of a lip shape according to another embodiment of the present invention. In this example, a lip section 65 is forced having a v shape configuration on each opposing end. As is the case with lip 21 of FIG. 1, the v form is made to extend along the longitudinal edge of blade insert 13 of FIG. 1. This v formation produces a double-edge effect providing a second swipe at a surface during one initial pass of water blade 11.

Figure 8B:
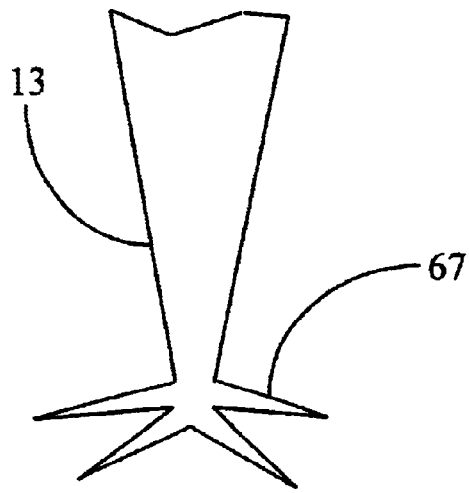
FIG. 8B is an end view of a lip design according to yet another embodiment of the present invention.

FIG. 8B is an end view of a lip design according to yet another embodiment of the present invention. In this example, a lip section 67 is formed having a v shape similar to lip 65 of FIG. 8A accept that the opposing formations are much closer together. Such a formation may be used, for example, when raised areas or portions of a surface are not particularly high therefore not requiring substantial length with regard to lip formation.

Figure 8C:
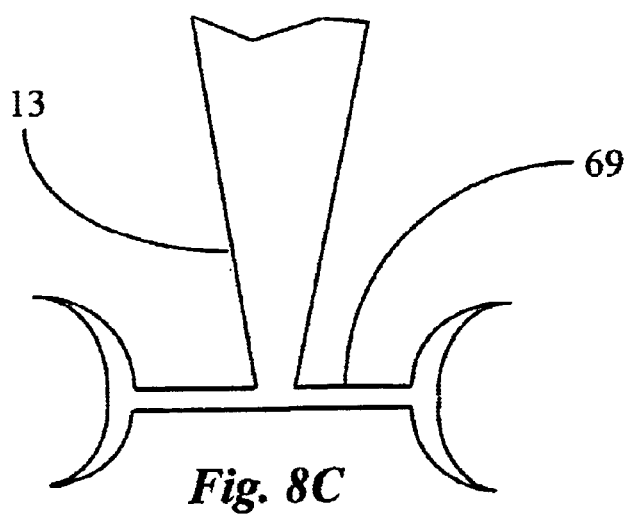
FIG. 8C is an end view of a lip design according to still another embodiment of the present invention.

FIG. 8C is an end view of a lip design according to still another embodiment of the present invention. In this example, a lip 69 is formed having a half-moon shape on opposing ends and a substantially straight bridge connecting the half-moon shapes to each other. As with the previous two examples, there are now two swiping edges that are able to make contact with a surface during one pass with blade 11. A formation such as seen in this embodiment may be useful for a surface that has a series of rounded rows forming a ribbed surface. The formation shown here would allow bi-directional motion of water blade 11 such as across the rows and down the rows wherein water removal is successful in either direction.

Figure 9:
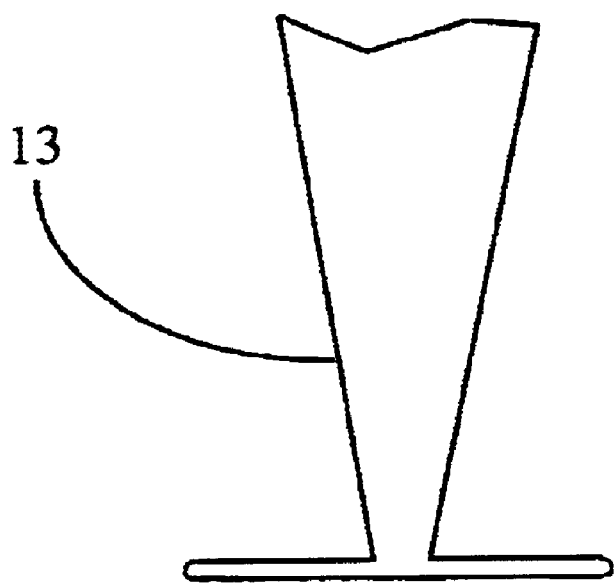
FIG. 9 is an end view of yet another embodiment of the present invention.

FIG. 9 is an end view of yet another, and simpler, embodiment of the present invention. In this embodiment the lip is a simple straight projection forming an orthogonal T-bar at the bottom of blade 13, the T-bar having essentially constant wall thickness.

Effective Spray-on Wax Application Using Water Blade

Figure 10A:
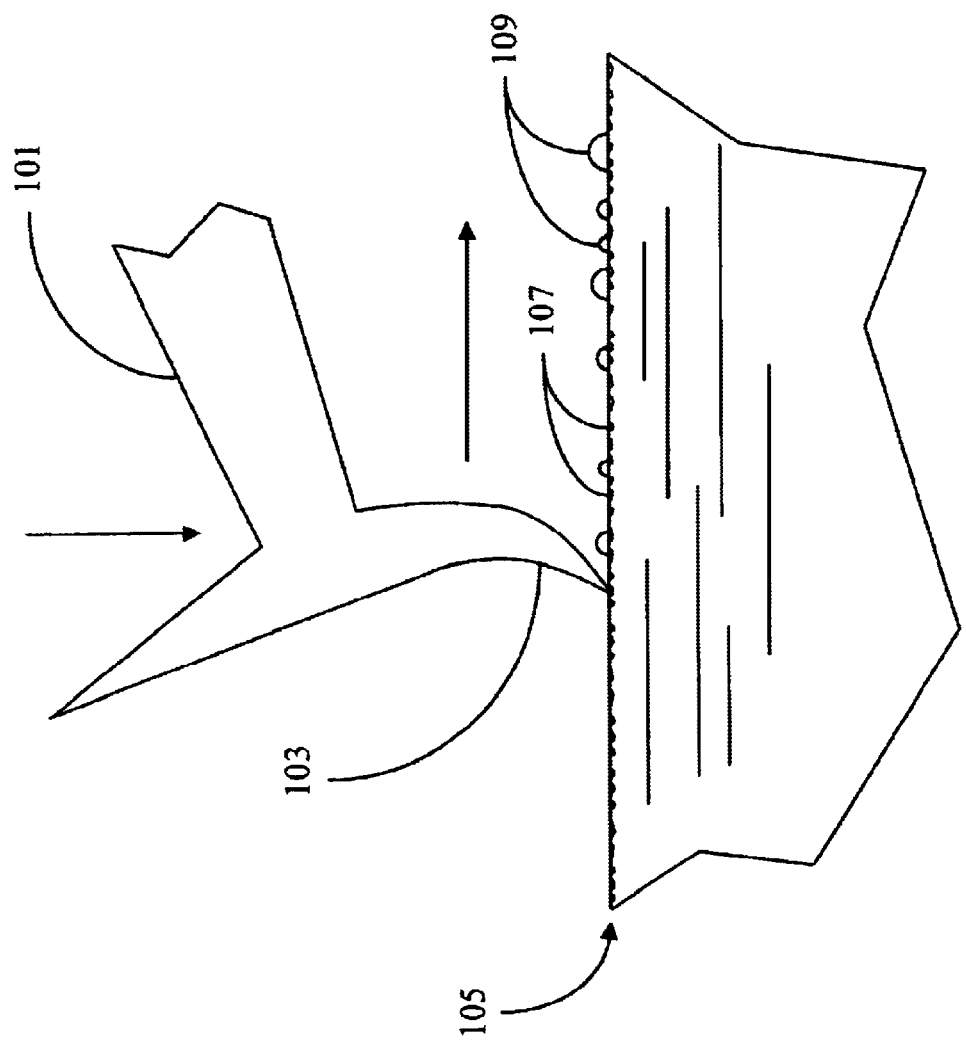
FIG. 10A is an end view of the lip area of a water blade element according to an embodiment of the present invention, applied to a surface upon which a spray-on wax has been applied, with one lip urged into the surface.

In another aspect of the present invention the water wiping apparatus described above in various embodiments provides an effective means for applying spray-on wax or other such finishing products that are sprayed on to a just-washed painted surface. It is an object of the present invention, as shown in the embodiment of FIG. 10A, to provide an improved method and apparatus for evenly spreading spray-on wax or other such vehicle finish products that are sprayed on a wet or dry just-washed painted surface, while significantly improving the application of the distributed spray-on wax or other such spray-on finishing products to the surface. It must be noted, however, that the invention is in no way limited to automotive paint, and the invention may be practiced in various embodiments on a variety of surfaces onto which a spray-on finishing product, such as spray-on wax, may be applied.

The improved method and apparatus according to a preferred embodiment of the present invention, as is described below in enabling detail, is best practiced on a substantially flat painted surface. However, various alternative embodiments of the invention, as described above utilizing different shapes and styles in the lip area of the wiper blade insert, may be used for effectively applying a spray-on finishing product to curved or contoured services, or other services not substantially flat, and also to surfaces is having projections emanating from the surface, such as rivet heads, raised ornamental patterns, and the like.

FIG. 10A is an end view of the lip area of a water blade element according to an embodiment of the present invention, as described in detail above, applied to a painted surface with one lip urged into the surface. Blade element 101, similar to that of FIG. 1, is shown in this view having a lip region 103, lip region 103 provided in this embodiment along the longitudinal bottom edge of blade element 101. In the preferred embodiment shown blade element 101 is molded or otherwise formed from a silicon rubber material, but it will be apparent to one skilled in the art however that blade element 101 may be manufactured from other materials having similar suitable flexibility and resilience.

In the embodiment shown in this view, a surface 105 is illustrated which represents the outer surface of a portion of the body of a vehicle being detailed, which is covered with a layer of typical automotive paint, onto the surface of which an aspect of the present invention, as will be described below in detail, is practiced. Surface 105 in the embodiment shown is a typical layering of automotive paint, but may also be of a variety of different paint types applied using various known methods.

As is well-known in the art, a typical painted surface of a vehicle, although appearing substantially smooth and glossy to the naked eye when the paint is properly applied, is actually quite porous, comprising a multitude of tiny pores in the form of valleys and crevices. Such a surface is especially apparent when the painted surface is viewed under very high magnification. A plurality of pores 107 indicate such a porous surface in the present illustration, however pores 107 are greatly enlarged in this view, relative to blade element 101 and surface 105, for the purpose of illustration.

Surface 105 in the embodiment shown is a just-washed painted surface on which a portion of the water used in washing the surface remains, As previously mentioned, however, in practicing the present invention in alternative embodiments it is not required that the just-washed surface of the paint still be wet from the washing. As is typical in the art of detailing an automotive painted finish, the spray-on wax product, or other spray-on finishing product is applied to the wet surface of the paint by spraying just after washing the surface, before the remaining water droplets have evaporated. It is desirable that the spray-on wax or other finishing product sprayed onto the wet surface is mixed with the remaining water droplets on the painted surface, such that dispersion of the wax product is enhanced by virtue of the remaining water. Droplets 109 in the embodiment shown represent the remaining water from the washing, mixed with a spray-on wax product that has been sprayed on the wet surface of surface 105. Although detail is not explicitly shown in this view, solid elements of the spray-on wax product or other finishing product are suspended along with the carrier for the spray-on wax product within the remaining water droplets 109 on surface 105. Much greater detail of such suspended wax solids within the remaining water droplets, as well as the tiny crevices and valleys forming the porous painted surface are shown in a subsequent illustration, FIG. 10B.

In practice of the present invention in the embodiment shown in FIG. 10A, blade element 101, with lip portion 103 urged against surface 105, is drawn horizontally in the direction indicated, with consistent downward pressure applied to blade element 101 as indicated by the downward directional arrow. Blade element 101, as shown in the view, is disposed at an angle such that when drawn horizontally across surface 105 with slight downward pressure applied to blade element 101, lip portion 103 bends slightly backward trailing behind blade element 101, and skims surface 105 for the purpose of dispersing (removing) much of the remaining water in droplets 109, as described above for previous embodiments, but at the same time applying the solid wax products within droplets 109 to surface 105, such that a much greater portion of the solid wax products within droplets 109 are applied and settled into pores 107 of surface 105, when compared to conventional methods of wiping the droplets of water and wax using sets of wiping cloths or chamois.

Figure 10B:
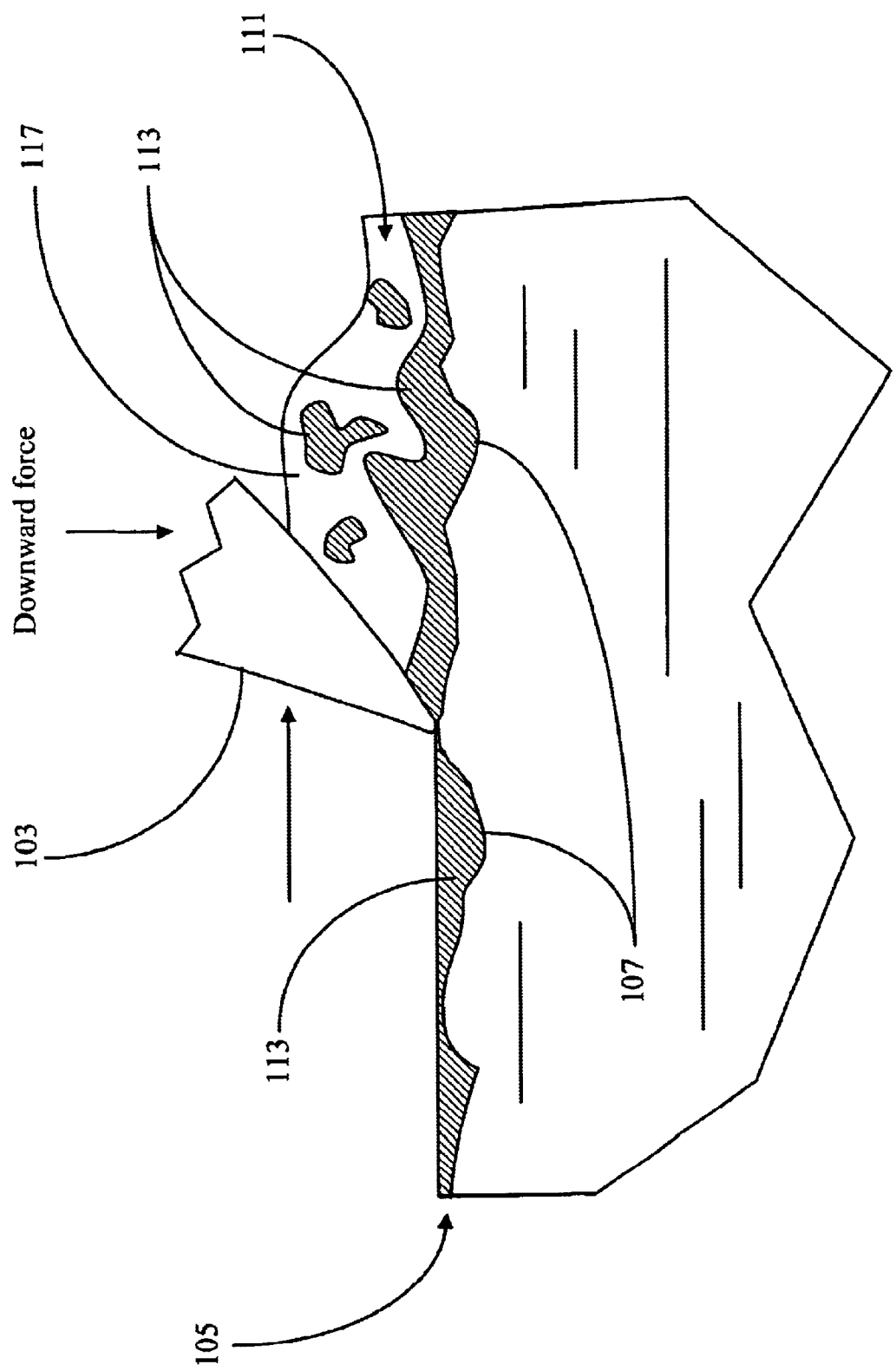
FIG. 10B is an end view of the lip area and surface of FIG. 10A, with water and spray-on wax, enlarged to show greater detail.

FIG. 10B is an end view of lip portion 103 and surface 105 of FIG. 10A, enlarged to show greater detail of pores 107 and the mixture of water and wax solids remaining on the surface. The tiny crevices and valleys forming pores 107, which, as described above, are typical of automotive paint, are clearly illustrated in this view, creating the porous qualities of surface 105. It is noted, however, that the illustration of 105 and pores 107 is exemplary only, and may or may not represent the actual appearance of such pores in an actual surface coated with automotive paint. The inventor deems the exemplary illustration as sufficient, however, to depict the microscopic pores 107 and practice of the present invention.

As detailed in the previous illustration FIG. 10A, lip portion 103 is drawn horizontally as indicated by the directional arrow, across surface 105, with slight downward pressure applied as indicated to lip portion 103, thereby urging the lower tip of lip portion 103 down onto surface 105. As described above with reference to previous illustrations depicting removing of standing water from the painted surface using the wiper blade of the present invention, the wiping action utilized in the present illustration for removing standing water and applying spray-on wax is the same.

Forward of lip portion 103 there is a mixture 111 of water and wax solids comprising water 117, which is the remaining water on the just-washed surface 105, and wax solids 113 which have been sprayed, along with the carrier solution (not shown), onto surface 105 just after washing. As detailed in this view, a portion of the wax solids 113 of mixture 111 are still suspended in water 117, and a portion of solids 113 have settled into pores 107. Mixture 111 is moved by the forward horizontal motion of lip portion 103 across surface 105, and creates a mixing action for water 117 and wax solids 113 as it is drawn horizontally at the proper angle with slight downward pressure, as shown, across surface 105. Lip portion 103, as described above in previous embodiments, disperses (removes) a substantial portion of the remaining wash water and carrier solution on surface 105 and tends to force a substantial portion of wax solids 113 into pores 107.

The resulting layer of wax solids, which is now evenly distributed across surface 105, even if the wax solution was sprayed on unevenly, remains behind lip portion 103 to form a desired smooth protective and specular wax finish on surface 105 as shown, substantially filling the uneven surface and pores 107 of surface 105. The resulting finish appears to be smoother and much shinier to the naked eye when compared to a conventional finish utilizing sets of common wiping cloths or chamois for wiping the water/wax mixture after washing of the surface, as in conventional detailing using spray-on wax products.

As previously described, practice of the invention does not require that water droplets remain on the just-washed surface. Some spray-on wax products are solvent-based, instead of water-based, and may contain a much higher proportion of wax solids to carrier solution, and thus provide somewhat more protective abilities to the surface being detailed. Many liquid spray wax products are designed just for touch-up waxing of the surface finish of the vehicle without using water at all, the idea being that if the surface to be detailed is substantially free of dirt particles and already has a base wax which has been previously applied, a detailer can spray the dry-wax liquid directly onto the vehicle surface, and utilize the wiper blade of the present invention as described above to evenly disperse the wax solids of the spray-on product over the painted surface. In such a way porousness of the surface being detailed is further reduced by virtue of the wax solids of the spray-on product being forced into the tiny crevices of the painted surface, over the previous wax solids that are already in the crevices by virtue of the previous wax application. A much smoother surface is thereby created which appears much shinier to the naked eye after application utilizing the wiper blade of the present invention as described above. Such dry-washing products usually provide the longest protective durability, often lasting up to several months. Many dry-wash products on the market today also contain stronger protective elements, when compared to standard spray-on wax/cleaning products, some even containing an added liquefied polymer sealant, providing a further enhanced protective durability that can range from several weeks to several months.

Alternative Handle and Wiper Blade Sizes and Shapes

In other examples of alternative embodiments of a hand held water blade device for removing standing water from, or applying various finishing products to a vehicle surface, handles of various sizes and shapes, and larger or smaller wiper blade inserts, as well as different aspect ratios of length to height, will be desirable for certain situations.

Figure 11A:
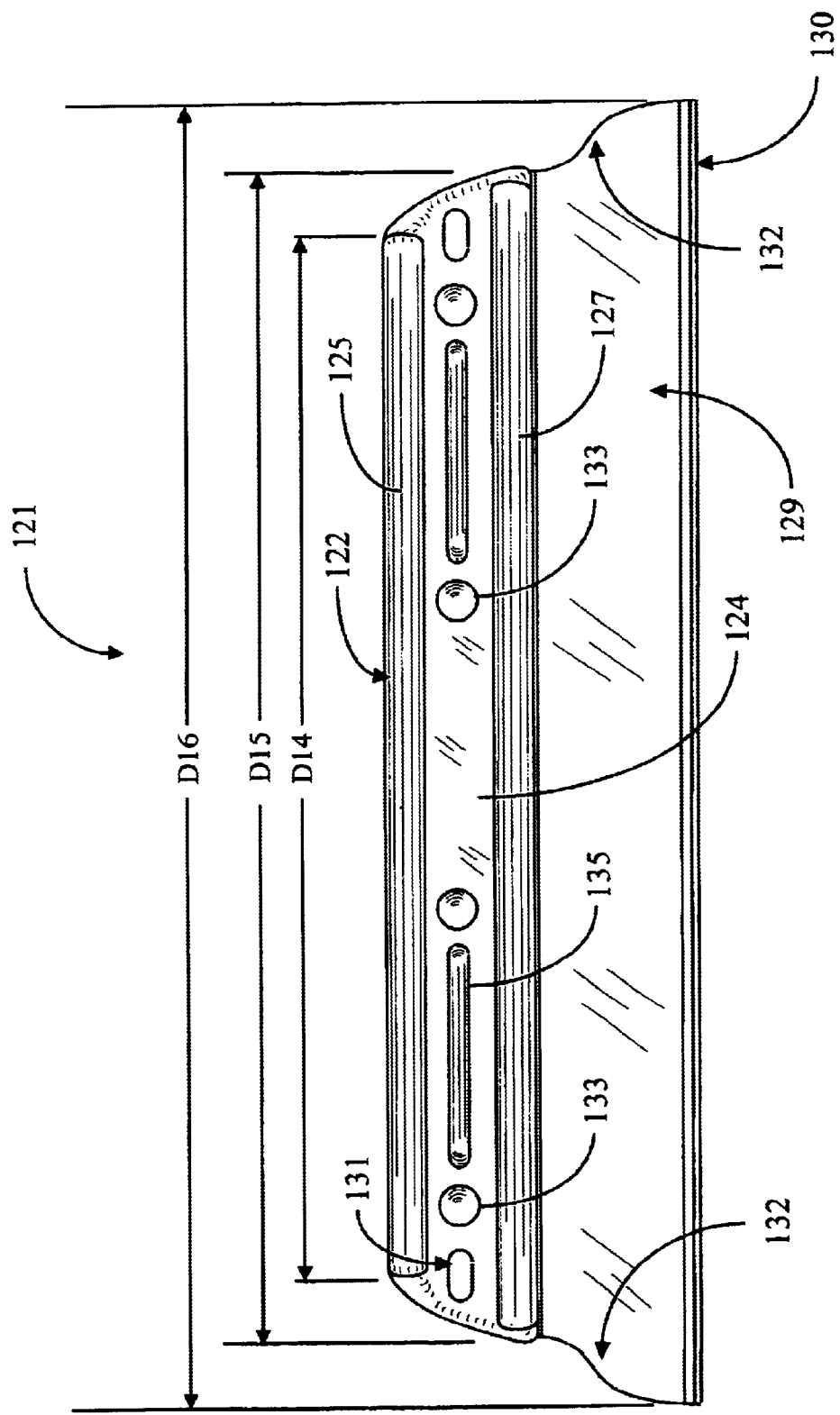
FIG. 11A is an elevation view of a hand-held water blade according to an alternative embodiment of the present invention.

FIG. 11A is an elevation view of a hand-held water blade according to an alternative embodiment of the present invention. Water blade 121 is provided with a two-part handle 122 consisting of a first section 124 adapted to fasten to a second section 126 (not shown), capturing a wiper blade insert 129 between the fastened handle sections, thereby forming a functioning water blade 121. The second handle section 126 is subsequently illustrated in FIG. 11B and 11C. Handle sections 124 and 126 are molded from polypropylene, or other similar plasticized material in an injection molding process, similarly to handles for water blade 11 of FIG. 1.

In the embodiment shown, handle sections 124 and 126 are affixed to one another capturing blade insert 129, utilizing, in one embodiment, a plurality of plastic rivets 133 affixed using a plastic welding technique, rivets 133 strategically located along the length of handle 122 to provide a secure attachment between the two handle sections, while minimizing undue flexing of the assembled handle 122. In an alternative embodiment however, as noted previously for other embodiments illustrated and described herein, other fabrication methods may be employed such as gluing the handle sections together, utilizing screws or metal rivets, or attaching handle sections together using a plastic welding technique without the use of rivets screws and the like. Handle 122, in other alternative embodiment may be molded as a single piece, the blade inserted along a slot at the bottom of the handle, for example. Additionally other materials, plasticized or not, may be used to fabricating handle sections 124 and 126 without departing from the scope and spirit of the invention.

Water blade 121 is of similar overall form and function to water blade 11 of FIG. 1, with notable differences, however, in the actual shape, size and form of the handle, as well as that of the blade insert, to provide special and optimized functionality. Handle 122 in the embodiment illustrated is provided with a rounded upper ridge portion 125 and a rounded lower ridge portion 127, protruding laterally from the side of each of handle sections 124 and 126, and extending substantially along the length of each handle section, thereby forming a valley portion in between the ridges along the length of handle 122. This recessed portion provides for a better grip without it being necessary to partially grip the blade insert.

Upper ridge portion 125 in a preferred embodiment has a length dimension D14 equal to about 8¾ inches, and extends laterally from the side of each handle section approximately twice the distance of that of lower ridge portion 127. Lower ridge portion 127 has a length dimension approximately equal to that of handle 122, which is approximately 9¾ inches, represented in the illustration by dimension D15. The upper and lower ridge portions provide the user with a comfortable and secure grip for water blade 121. Upper ridge portion 125 provides the majority of the grasp area for the user's hand, with the user's thumb and fingers preferably resting on and slightly urged into the sides of the handle between the upper and lower ridge portions. As will be further detailed below, lower ridge portion 127 in a preferred embodiment protrudes laterally from the sides of handle 122 to an extend that helps prevent the user's thumb or fingers from inadvertently slipping down from the handle onto the blade insert, during use of blade 121, but also is shallow enough wherein the user may also easily extend the thumb or any number of the fingers downward from between the upper and lower ridge portions 125 and 127, while still grasping and using water blade 121, in order to manually press blade insert 129 into recessed areas of a surface to be dried, or shape the blade insert around various odd shapes of protrusions on the surface, for example.

The grip is further enhanced for handle sections 124 and 126 by the plurality of rivets 133 on either side, and a pair of protruding ridges 135 which are along the length between upper ridge 125 and lower ridge 127. In this manner the user is enabled to grasp handle 122 in a variety of positions along the length of handle 122, while always maintaining a secure grip. Although it is not illustrated in this particular example, other embodiments of the present invention may have a textured surface over the upper and lower ridge portions, as well as over the flat valley section between the ridges and/or over the surfaces of the rivets 133 or ridges 135 between the upper and lower ridge portions, or may alternatively utilize a succession of raised ribs, bumps, and so on, over the surfaces to further enhance the user's grip.

Elongated through-openings 131 are provided for water blade 121, located near each opposite and of handle 122, for the purpose of hanging water blade 121 on such as a tool hook, peg, nail, or other similar hanging apparatus, so as to provide convenient storage for water blade 121 while preventing the blade insert from resting on any surface when water blade 121 is not in use, which may over a sustained period of time may possibly deform, or otherwise damage blade insert 129.

In addition to the features described just above for handle 122, the ends of the handle are now well rounded toward the length direction of the handle and assembles water-wiper blade. The purpose of this rounding is to provide for a soft effect in use, such that inadvertent contact with a surface being wiped will be over a broad surface area of the handle, rather than a sharp edge or point. Such contact is discouraged, of course, but in, frequent use, nearly certain to happen. The rounded "soft" handle helps greatly to avoid marking a finished surface.

In addition to notable differences described above in handle 122, as compared with the handle of water blade 11 of FIG. 1, blade insert 129 itself also has a distinct difference in height, shape, and aspect ratios for length to height with respect to the overall dimensions of water blade 121. Blade insert 129 is formed similarly to blade insert 13 of FIG. 1, from a silicon rubber material by an injection molding process, and is also similar in flexibility rating, which in alternative embodiments may be more or less than the preferred 30 to 70 durometer, depending on a number of factors that also effect functionality, such as blade thickness, taper, blade height, and so on.

Blade insert 129 has various dimensions and molded features, several of which are important to unique functionality of wiper blade's in embodiments of the present invention. For example, blade insert 129 has a lip region 130 provided along the longitudinal bottom edge of blade insert 129, with lip elements extending laterally from the bottom edge, and also has a groove (not shown) formed around the upper perimeter of blade insert 129 providing a T-section portion enabling a secure locking arrangement when handle sections 124 and 126 are closed, thereby preventing blade insert 129 from moving back and forth with respect to the grip handle.

Notable differences, however, between blade insert 129 of the present embodiment and blade insert 13 of water blade 11 of FIG. 1, include the overall shape of blade insert 129, particularly at the ends, and the length of blade 129 with respect to that of handle portion 122. As described and illustrated previously, blade insert 13 for water blade 11 of FIG. 1, is rectangular in shape and substantially equal in length to the handle portion, whereas blade insert 129 of the present embodiment is substantially greater in length than the handle portion. The length dimension of the lower lip portion of the blade insert, which is directly related to the water displacement capability per stroke during use of the water blade having a rectangular blade insert, is equal to the handle length.

Handle portion 122 of the illustrated embodiment has an overall length of approximately 9¾ inches, which is represented in the illustration by dimension D15, whereas blade insert 129 has an overall length at the lower lip portion of approximately 11 inches, represented by dimension D16. Each outer edge of blade 129 has a curved portion 132 extending downward beginning at the bottom of each opposite end of handle 122, and curving downward, outward and then downward again thereby providing the increased length at the lower lip portion 130. The resulting blade length to handle length ratio of water blade 121 provides a significantly increased water displacement capability per stroke during use, while saving labor and raw materials in the manufacture of the handle, as a handle may be significantly shorter in comparison to the length of lip portion 130, or dimension D16. A handle of smaller handle to blade length ratio, such as handle 122, will also be of a significantly lighter weight thereby furthering ease-of-use.

There is another significant purpose to the additional length of the blade as opposed to the handle, and that is the fact of further displacing the handle in use from the finished surfaces being wiped, and reducing the probability that the handle might inadvertently contact those surfaces, perhaps leaving a mark. So, the shorter handle (as opposed to blade length) and the rounded shape at the handle ends both contribute to the "soft" aspect of this water wiper blade in embodiments of the present invention.

Downward pressure is evenly distributed along the entire length of lip portion 130 due to the consistency in the resilience, or durometer of the silicon material of blade insert 129 along its length, and the downwardly and outwardly curved outer ends 132 of blade insert 129, which are shaped such that the downward force of the handle during use is applied equally to the center portion and outer tips of lip portion 130, as well as all points in between.

Figure 11B:
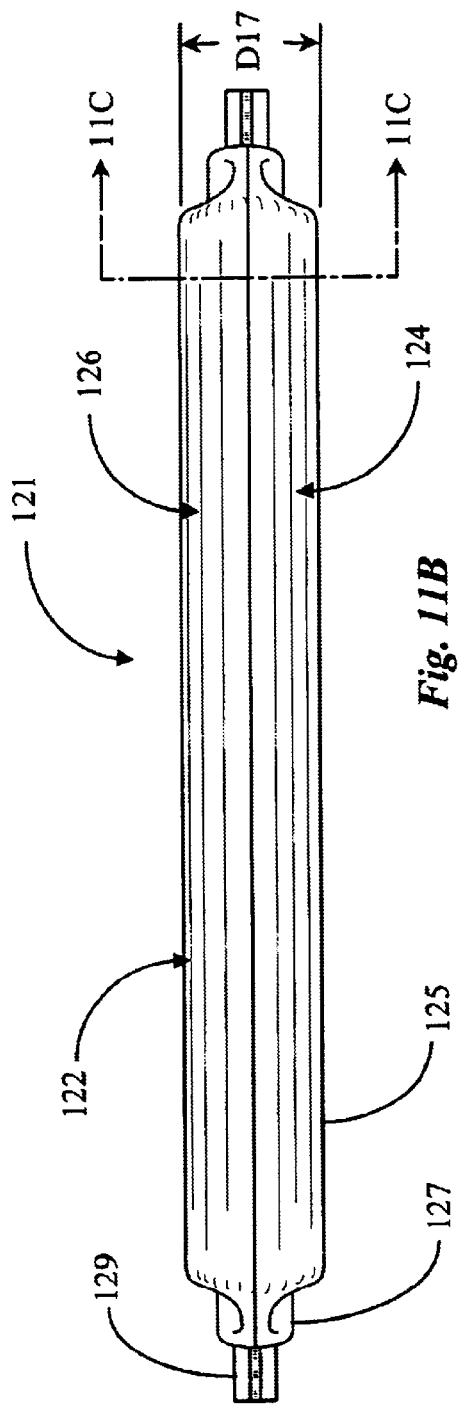
FIG. 11B is a top view of the water blade of FIG. 11A.

FIG. 11B is a top view of water blade 121 of FIG. 11A. Handle sections 124 and 126 are shown fitted together as previously described forming handle 122, with blade insert 129 captured between handle sections 124 and 126, the outer ends of which are shown continuing out from the furthest outward ends of lower ridge 127. Handle sections 124 and 126 each have a downward curvature in the surface beginning where each section meets at the top, such that when fitted together a slightly rounded upper surface is formed in handle 122, which when combined with the curvature of upper ridges of each handle section 124 and 126, a comfortable yet secure grip is provided to the user.

Figure 11C:
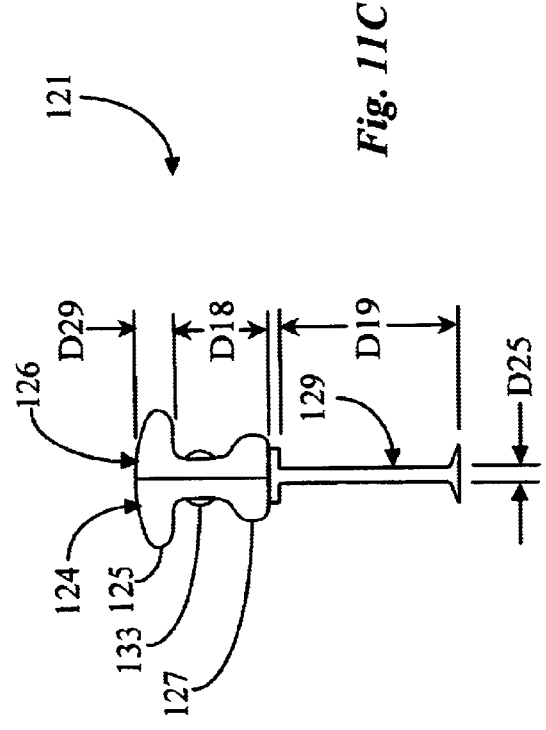
FIG. 11C is a section view of the water blade of FIG. 11B taken along section line 11C—11C of FIG. 11B.

Width dimension D17 for handle 122, in a preferred embodiment as shown, is approximately 1-⅛ inches, and, as illustrated in FIG. 11C, the height dimension D29 for upper ridge portion 125, is approximately ¼ inch, and the overall high dimension D18 for handle 122 is approximately 1-¼ inches. The resulting semi-oval shape and circumference of the upper and lower portions of handle 122 form a handle shape which has been empirically determined by the inventor to provide an ideal combination of comfort and grip for the specific type of dual-ridge handle shape of the preferred embodiment. It will be apparent to one with skill and art, however, that the dimensions with respect to length, width and height of the grip handle formed by handle sections 124 and 126 may vary somewhat without departing from the unique aspects of the outer shape of handle 122 formed by sections 124 and 126.

FIG. 11C is a section view of water blade 121 of FIG. 11B taken along section line 11C—11C of FIG. 11B. The outer curved shape of upper ridge portions 125 and lower ridge portions 127 of each handle section 124 and 126 form a valley area between them, clearly illustrated now in this view. In the present embodiment the method of attachment for a handle sections is plastic-welded riveting. Rivets 133 are shown in this view attaching one handle section to the other, and the rivet heads are seen protruding slightly out from the sides of handle sections 124 and 126. The plastic rivet heads may be positioned, textured or otherwise adapted for providing additional gripping capability for handle 122. As previously noted, however, a variety of methods may be utilized for attachment of handle sections 124 and 126, such as brackets in one handle section for accepting rivets or screws or some other common fastener inserted through access points in the opposite handle section, for example.

In this view the approximate dimensions of some of the various molded features of blade insert 129, some of which are important to the unique functionality of wiper blades in embodiments of the present invention. Blade insert 129 is similar in overall design and functionality to blade 13 of FIG. 1, having a lower lip portion having lip elements extending laterally from the bottom edge, which engage the surface to the dried, and an upper T-portion (partially shown) providing a groove along the length of blade insert 129 for attachment to handle sections 124 and 126.

Water blade 121 in a preferred embodiment is compact, lightweight and adapted for substantial water displacement capability relative to handle size due to the shape of the wiper blade insert. The ability of water blade 121, due to its shorter overall length, to be highly maneuverable over certain contours in surfaces to be dried, while maintaining the excellent water displacement capacity and sufficient downward force for the lip portion of the blade insert, is largely due to the height of the blade relative to the length as illustrated herein. As mentioned above relative to FIG. 11A, blade insert 129 has a height dimension D19 of approximately 1-5/16", which is the effective free flexible height from the bottom of blade insert 129 to the bottom of the grip handle formed by handle sections 124 and 126. Length dimension D16 of blade 129 is approximately 11 inches. The main body of blade insert 129 has a thickness, represented by dimension D25, of approximately 1/8" to 3/16 inch. The ratio of free height to length to thickness of the material of blade insert 129, in this embodiment, is that which has been empirically discovered by the inventor to provide the best combination for usefulness in a smaller, lightweight hand-held water blade such as described herein, when used for dispersing water from, and/or applying products to certain contours and shapes of automotive or other such surfaces.

Figure 12A:
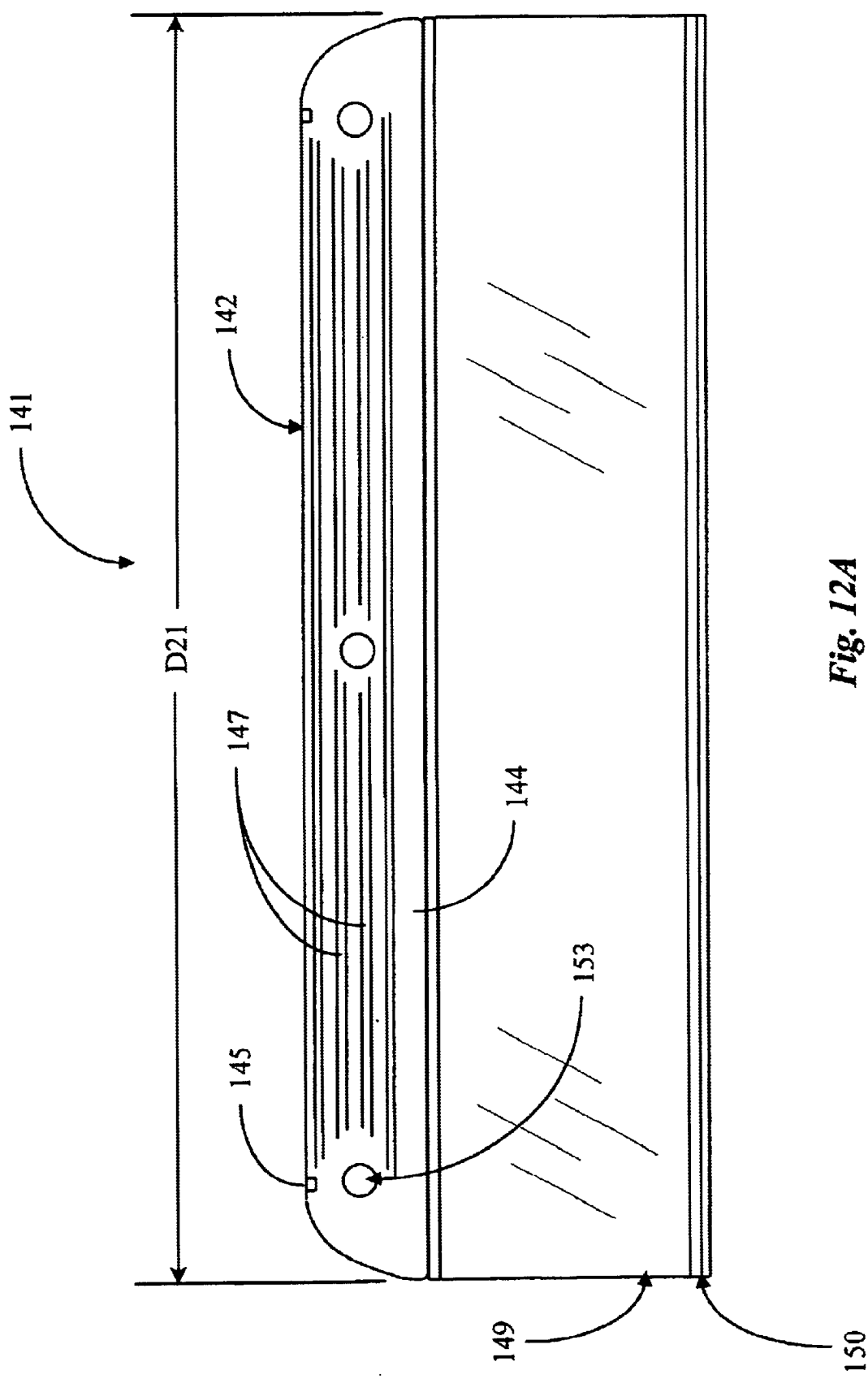
FIG. 12A is an elevation view of a hand-held water blade according to an alternative embodiment of the present invention.

FIG. 12A is an elevation view of a hand-held water blade according to yet another alternative embodiment of the present invention. Water blade 141 in the embodiment presented, has a handle 142 which is somewhat shorter than previous embodiments described, having a dimension D21 which equals approximately 12 inches, and utilizes a rectangular blade insert 149 having the same length dimension as handle 142. Blade insert 149, however, has a higher height to length aspect ratio, providing the user with the ability to displace water from the surface of a particular type of vehicle, for example, which contains many more curved features that are pronounced.

Water blade 141 comprises a handle 142 formed by attaching two molded plastic handle sections 144 and 146, which are adapted to be fitted together while securing blade insert 149 between them, similarly to embodiments previously described. In the elevation view of FIG. 12A, however, only handle section 144 is shown. The method of attachment in the embodiment illustrated also utilizes a plurality of brackets in one handle section (not shown) for attaching rivets or screws, accessed via a plurality of through openings 153 in handle section 144. The method of attachment of the handle sections, however, may vary as described previously for other embodiments.

Handle 142 in this embodiment also comprises a plurality of raised ribs extending lengthwise along each molded handle section, and strategically located around the curved sides of each handle section providing the user with an enhanced grip around an assembled handle 142. In addition, each handle section comprises raised protrusions having a flat upper surface extending laterally to the length of handle 142, located near either end of the handle sections, and optionally elsewhere as well, such that when the handle sections are fitted together, flat protrusions 145 or formed which enable the user, when not using water blade 141, to rest water blade 141 upside down on a flat, level surface, supported by flat protrusions 145. In this manner, lip portion 150 of blade insert 149 is protected from damage or de-formation which may otherwise occur if water blade 141 is left to rest on its side on the surface. Protrusions 145 have a secondary purpose, which is that they serve as an anti-slip feature for interfacing to a slip-on handle adapter, which allows a user to add a handle extension to the water blade, to be able to use the water blade on very large vehicles.

Figure 12B:
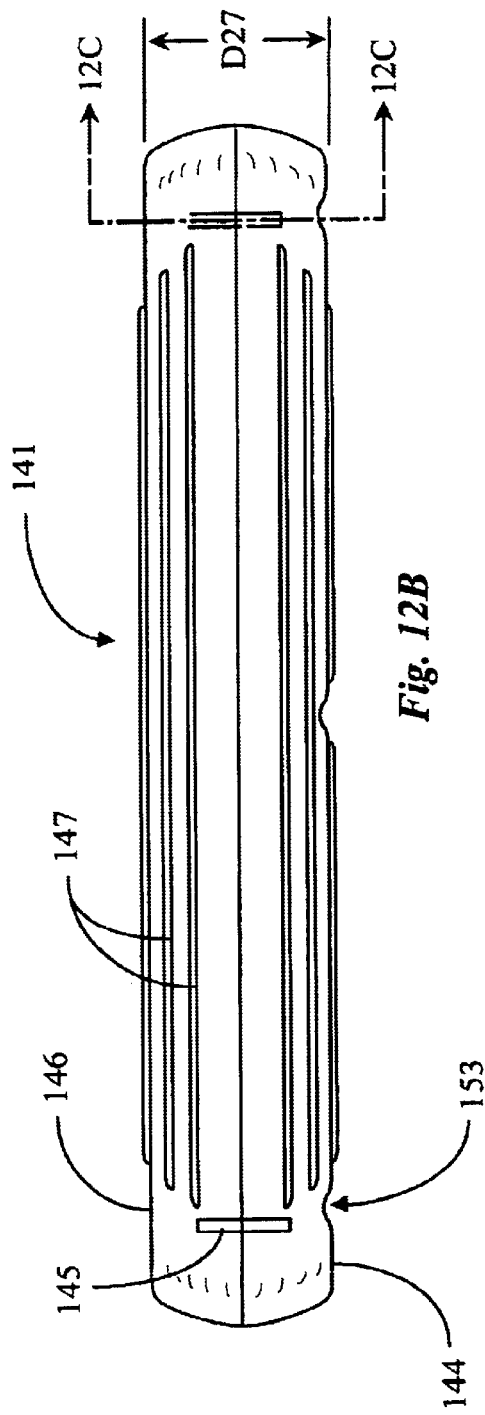
FIG. 12B is a top view of the hand-held water blade of FIG. 12A.

FIG. 12B is a top view of water blade 141 of FIG. 12A, illustrating the pair of molded handle sections 144 and 146 fitted together according to an embodiment of present invention. Handle 142 is formed by attaching handle sections to each other as previously described for other embodiments, having a width dimension D17 equaling approximately 1¾ inches, a dimension empirically determined by the inventor to be ideal for the type and shape of handle 142 for providing a most comfortable and secure grip.

Gripping ribs 147 are shown extending along the length of each handle section providing an enhanced gripping surface for handle 142, and the flat protrusions 145 near each end of handle 142 are clearly visible on the top surface of handle 142. Through openings 153 of handle section 144 for accessing mounting brackets (not shown) handle section 146 have slight indentations into the body of handle section 144, which provides the user with a more comfortable grip over the openings and may also enhance the user's grip by allowing the user to anchor finger or thumb while gripping.

Figure 12C:
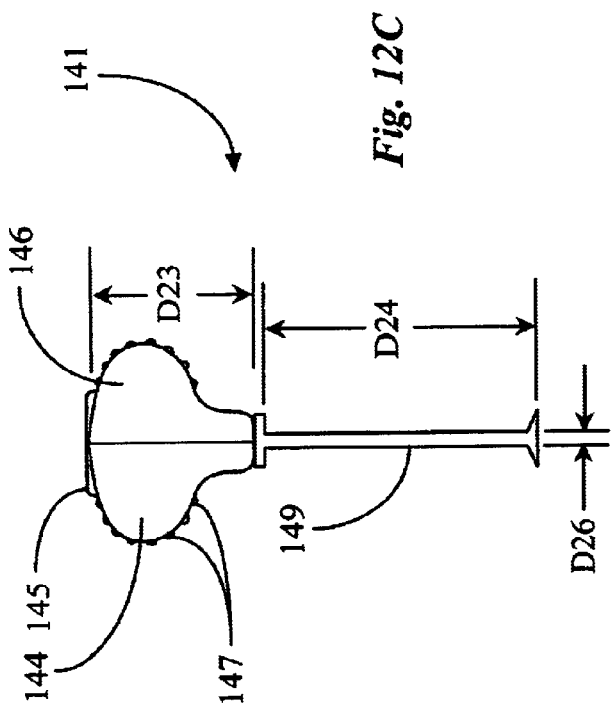
FIG. 12C is a section view of the water blade of FIG. 12B taken along section line 12C—12C of FIG. 12B.

FIG. 12C is a section view of water blade 141 of FIG. 12B taken along section line 12C—12C of FIG. 12B. The curved bell-shape formed by the attached handle sections 144 and 146 can be clearly seen in this view, as can the raised gripping ribs 147 on each handle section, and the flat surface protrusion 145 formed on the top of the handle. The handle formed by handle sections 144 and 146 has a height dimension D23 equaling approximately 1⅜ inches.

Blade insert 129, has mean material thickness of approximately 1/8 inch, represented by dimension D26, and as mentioned above, has a greater height to length aspect ratio for displacing water from surfaces having many more pronounced curvatures and features, having a height dimension D24 equaling approximately 2¼ inches. A significantly greater contact area width line around the curvature of the surface, an automobile fender, for example, is the result of height D24 of blade element 129.

Figure 13:
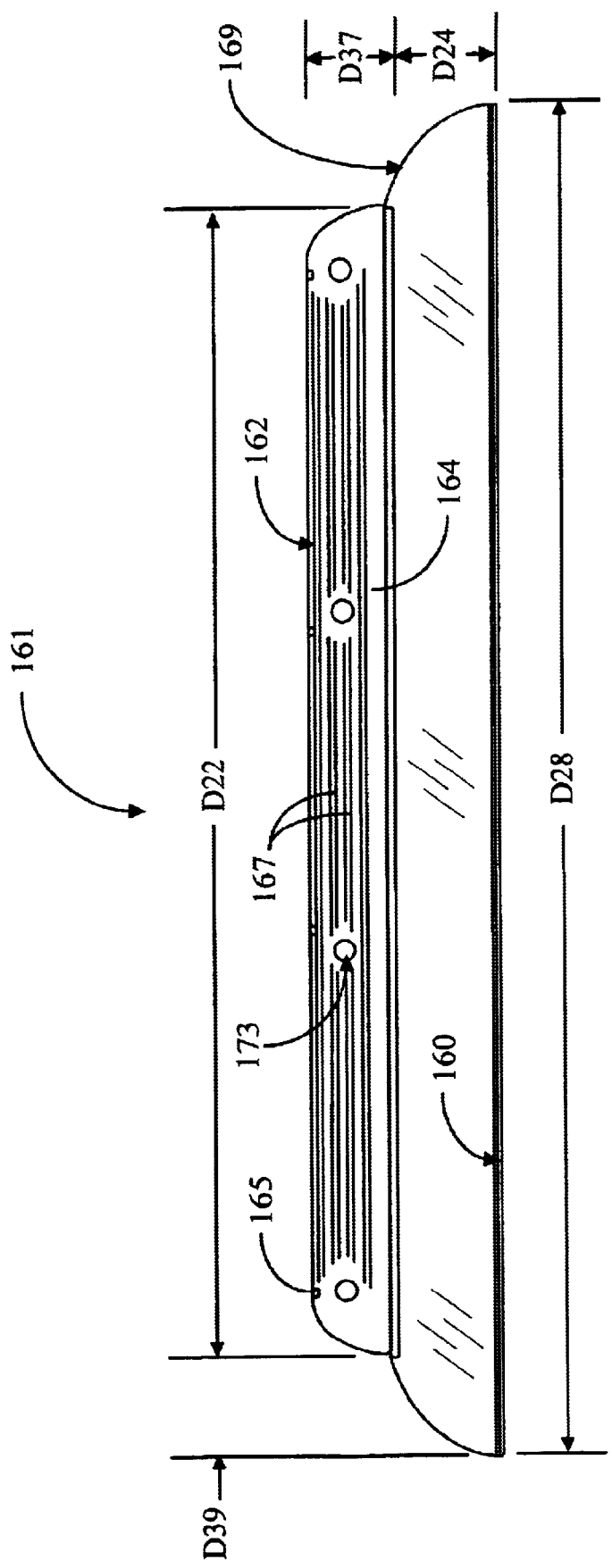
FIG. 13 is an elevation view of a hand-held water blade according to an alternative embodiment of the present invention.

FIG. 13 is an elevation view of a band-held water blade according to yet another alternative embodiment of the present invention. Water blade 161 has a handle 162 comprising a pair of attach handle sections, one of which, handle section 164, is shown in this elevation view. Water blade 161 is similar in form and function to water blade 141 of FIGS. 12A–12C, with the exception that the length of the handle and blade insert are greater with respect to height, than previous embodiments, for the purpose of enabling the user to achieve a much wider contact line on a surface from which water is dispersed during use of water blade 141. Water blade 141 is best suited for displacing maximum amounts of water from large surface areas with less pronounced curvature and surface features, in a single stroke.

Handle 162 has a length dimension D22 of approximately 15½ inches, and has a height dimension D37 of approximately 1¾ inches equal to that of handle 142 of FIG. 12, and also has a similar outside shape when the handle sections are attached together, securing blade insert 169. Also, similarly to handle 142 of FIG. 12, a plurality of raised grasping ribs 167 are also provided along the length of handle 162, as well as a plurality of through openings 173 for fastener access, and flat protrusions 165 on the top of handle 162 for standing water blade 161 upside down on a flat surface when water blade 161 is not in use.

Blade insert 169 attaches to handle 122, and has a lower lip portion 160 similar to embodiments previously described, however, blade insert 169 is substantially greater in length, having a length dimension D23 of approximately 18 inches in this embodiment. At either end of blade insert 169 is a curved portion which extends outwardly from each end of handle 162 and then curves downward to lip portion 160, extending outward from each end of handle 162 to a distance of approximately 1¼ inches, represented by dimension D29. The resulting blade length to handle length ratio of water blade 161 provides a significantly increased water disbursement capability per stroke during use, and downward pressure from handle 162 is evenly distributed along the entire length of lip portion 160 during use due to the consistency in the resilience, or durometer of the silicon material of blade insert 169 along its length, and the downwardly and outwardly curved outer ends of blade insert 169, which are shaped such that the downward force of the handle during use is applied equally to the center portion and outer tips of lip portion 160, as well as all points in between.

It will be apparent to one with skill in the art that examples shown and described herein are merely a few of many possible handle, blade insert and blade lip-design variations that may be implemented without departing from the spirit and scope of the present invention to provide for conforming to complicated shapes on surfaces to be processed with a wiper blade as taught herein.

In another example of alternative embodiments, larger or smaller water blades may be desirable for certain situations. For example, larger blades may be provided for use with large vehicles, such as tractor/trailer rigs and the like, or for vans and other trucks. In some embodiments, especially for use with large vehicles or other entities with large body areas, interfaces may be provided for handle extensions and the like, to allow a user to present the blade to otherwise hard-to-reach areas. Such interfaces might include such as ball and socket joints for flexibility in positioning a water blade in relationship to a handle.

As another example, many different materials could be used in the fabrication of a water blade in different embodiments. In other embodiments blade inserts may be of differing heights and lengths and may be sold separately to be inserted into one handle grip and so forth. The breadth of the present invention is limited only by the claims that follow.

What is claimed is:

1. A water-wiping apparatus for wiping standing water from a curved surface, comprising:
    a flexible panel of a first height, with an upper long edge of a first length and a lower long edge of a second length, greater than the first length, the upper long edge centered on the length of the lower long edge;
    a substantially rigid handle having a length substantially equal to the first length attached along the upper long edge; and
    a lip formed along the lower edge, extending to one side of the flexible panel and ending in a sharp line at the end away from the flexible panel:
    wherein each end of the upper long edge of the flexible panel is joined to the closest end of the lower long edge by a smooth, curved shape, convex relative to the flexible panel in at least a portion, the shape mirrored at each end of the panel.

2. The water-wiping apparatus of claim 1 wherein the lip has a triangular cross-section in a plane cutting the panel orthogonal to the length and parallel to the height.

3. The water-wiping apparatus of claim 2 wherein the lip joins the flexible panel at an angle equal or less than thirty degrees.

4. The water-wiping apparatus of claim 1 wherein the handle is symmetrical about a central plane common to the panel, and has two sides corresponding to opposite sides of the panel, further comprising an upper and a lower longitudinal ridge on each side of the handle, the ridges spaced apart to form a longitudinal groove to engage a user's fingers or thumb, providing a sure grip for the user on the handle.

5. The water-wiping apparatus of claim 4 wherein the upper longitudinal ridge on each side of the handle extends from the central plane of symmetry to a greater extent than does the lower longitudinal ridge.

6. The water-wiping apparatus of claim 1 wherein the lip extends to both sides of the flexible panel.

7. The water-wiping apparatus of claim 1 wherein the handle further comprises an interface for attaching a handle extension.

8. The water-wiping apparatus of claim 1 wherein the opposite ends of the handle are rounded, presenting a substantially curved outward surface toward the ends of the apparatus.

9. A blade insert for a water-wiping apparatus comprising:
    a flexible panel of a first height, with an upper long edge of a first length and a lower long edge of a second length, greater than the first length, the upper long edge centered on the length of the lower long edge;
    a handle interface along the upper long edge adapted to join the flexible panel to a rigid handle; and
    a lip formed along the lower edge, extending to one side of the flexible panel and ending in a sharp line at the end away from the flexible panel;
    wherein each end of the upper long edge of the flexible panel is joined to the closest end of the lower long edge by a smooth, curved shape, convex relative to the flexible panel in at least a portion, the shape mirrored at each end of the panel.

10. The blade insert of claim 9 wherein the lip has a triangular cross-section in a plane cutting the panel orthogonal to the length and parallel to the height.

11. The blade insert of claim 9 wherein the lip joins the flexible panel at an angle equal or less than thirty degrees.

12. The blade insert of claim 9 wherein the lip extends to both sides of the flexible panel.

* * * * *